United States Patent
Kataoka et al.

(10) Patent No.: US 8,149,656 B2
(45) Date of Patent: Apr. 3, 2012

(54) SWITCH DEVICE, INFORMATION PROCESSING DEVICE, AND REPRODUCTION DEVICE

(75) Inventors: Yoshinori Kataoka, Tokorozawa (JP); Youichi Yamada, Tokorozawa (JP); Yoshiyuki Kakuta, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1053 days.

(21) Appl. No.: 11/793,211

(22) PCT Filed: Nov. 25, 2005

(86) PCT No.: PCT/JP2005/021680
§ 371 (c)(1), (2), (4) Date: Mar. 6, 2008

(87) PCT Pub. No.: WO2006/067933
PCT Pub. Date: Jun. 29, 2006

(65) Prior Publication Data
US 2008/0212437 A1    Sep. 4, 2008

(30) Foreign Application Priority Data
Dec. 20, 2004   (JP) .................... 2004-368179

(51) Int. Cl.
*G11B 5/58* (2006.01)
(52) U.S. Cl. ............... 369/30.03; 369/30.05; 369/30.07; 369/30.1
(58) Field of Classification Search ............... 369/30.03, 369/30.05, 30.07, 30.1
See application file for complete search history.

(56) References Cited

U.S. PATENT DOCUMENTS

| | | | |
|---|---|---|---|
| 6,710,565 B2 * | 3/2004 | Maeda | 318/466 |
| 2004/0085865 A1 * | 5/2004 | Kataoka et al. | 369/30.36 |
| 2004/0190409 A1 | 9/2004 | Inoue et al. | |

FOREIGN PATENT DOCUMENTS

| | | |
|---|---|---|
| JP | 56-85365 | 7/1981 |
| JP | 57-066551 | 4/1982 |
| JP | 1-314685 | 12/1989 |
| JP | 9-152544 | 6/1997 |
| JP | 10-261346 | 9/1998 |
| JP | 2001-38048 | 2/2001 |
| JP | 2003-84848 | 3/2003 |

(Continued)

OTHER PUBLICATIONS

Office Action dated Oct. 26, 2010 issued for the corresponding Japanese patent application No. 2006-548743 with English translation.

(Continued)

*Primary Examiner* — Hoa T Nguyen
*Assistant Examiner* — Andrew Sasinowski
(74) *Attorney, Agent, or Firm* — Kratz, Quintos & Hanson, LLP

(57) ABSTRACT

A reproduction system 100 includes a rotating body on which a rotary operation is conducted by a user, a rotary movement detector 810 that detects the rotation of the rotating body and outputs a detection signal in accordance with a rotary condition thereof, and a restricting unit that conducts a restriction processing for restricting the rotation of the rotating body based on the detection signal. Accordingly, different resistance feeling in accordance with the rotary operation on the rotating body is provided to a user, thereby exhibiting excellent operational feeling just like a rotation of a turntable of a record player.

4 Claims, 21 Drawing Sheets

FOREIGN PATENT DOCUMENTS

| | | |
|---|---|---|
| JP | 2003-228455 | 8/2003 |
| JP | 2004-86958 | 3/2004 |
| JP | 2004-87192 | 3/2004 |
| JP | 2004-87195 | 3/2004 |
| JP | 2004-228022 | 8/2004 |
| JP | 2004-281003 | 10/2004 |
| JP | 2004-288341 | 10/2004 |

OTHER PUBLICATIONS

Japanese Office Action issued for corresponding Japanese Patent Application No. 2006-548743 dated Apr. 5, 2011.

* cited by examiner

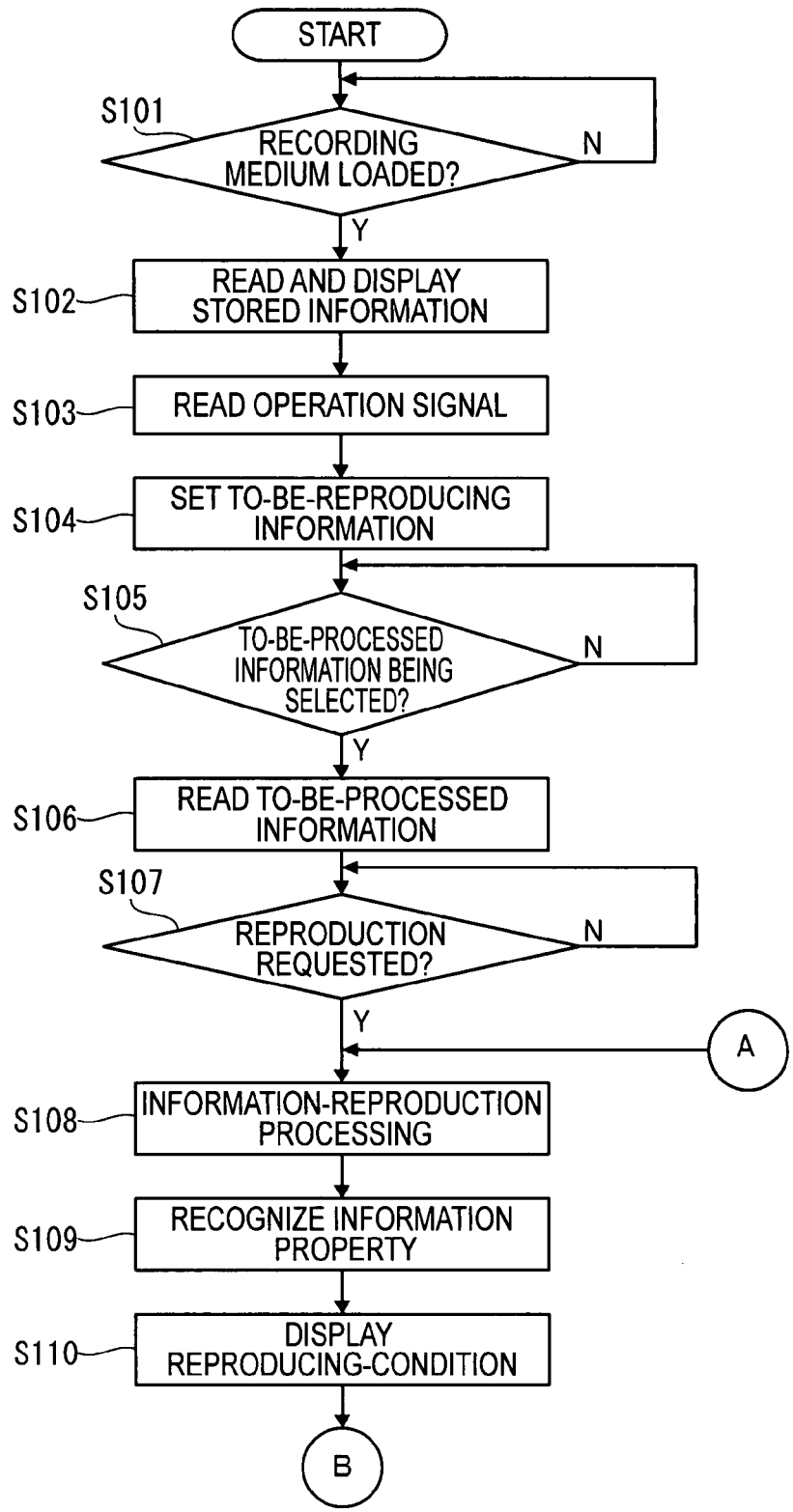

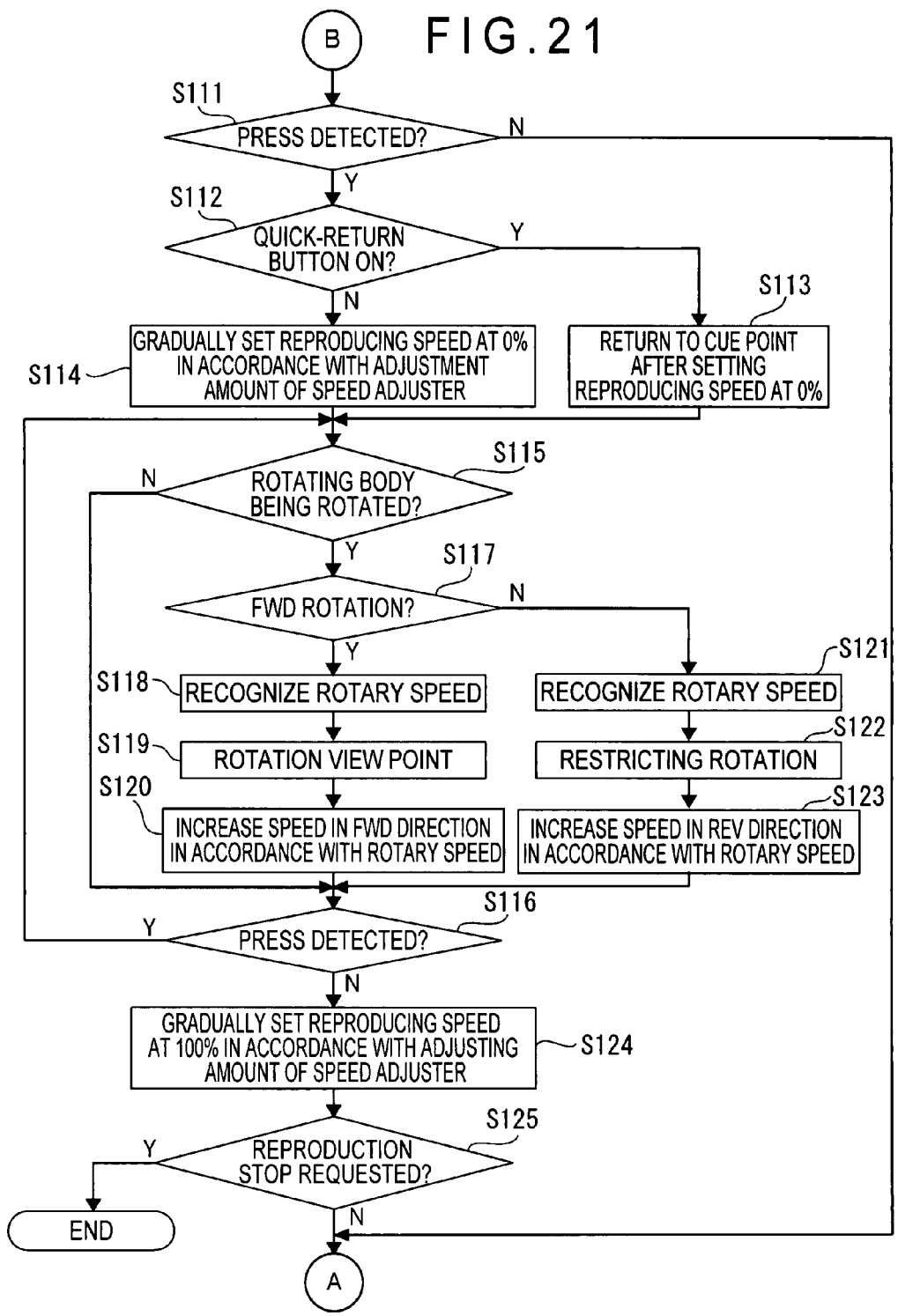

SWITCH DEVICE, INFORMATION PROCESSING DEVICE, AND REPRODUCTION DEVICE

TECHNICAL FIELD

The present invention relates to a switch device that has an operation unit on which an input operation is conducted, an information-processing device and reproduction device.

BACKGROUND ART

Various switch devices such as button-type and volume-type have been known as a control device for controlling electric signal. The various switch devices are selectably used for various electronic devices in terms of the type of electric signals to be controlled, control mode and design.

On the other hand, DJ playing has been known in playing music, where a record player is used as a reproducing device and a player, called as a disc jockey, plays dance music and the like. The DJ playing is a style for effectively playing music information recorded on a phonorecord as dance music and the like. Specifically, a disc jockey manually controls a rotation of a turntable of a record player on which a phonorecord is mounted to play and stop music information recorded on the phonorecord, or to conduct repeated playing of the same phrase of the music information and cueing to a position at which music start is desired.

A reproduction device has recently been developed, the reproduction device employing recording media such as CD (Compact Disc) and DVD (Digital Versatile Disc) on which audio information such as sound and music and image information such as video are recorded as digital data is used to reproduce music contents such as dance music and image contents (see Patent Document 1 and Patent Document 2). The devices disclosed in the Patent Documents 1 and 2 imitate operational feeling of an analog record player, where rotation of a turntable is manually pseudo-controlled to control reproducing condition of sound information. Specifically, a ring-shaped rotary drive is provided on a base in a manner movable in a toward-and-away direction (axial direction). A disc-shaped jog table is rotatably mounted on the rotary drive. The base is provided with a rotation sensor to which the rotation of the jog table is transmitted to detect the rotation of the jog table, and a tape-switch provided along the circumference of the base at a position opposing to the rotary drive to detect approaching movement of the rotary drive toward the base by the pressing operation of the jog table to detect the pressing of the jog table.

Patent Document 1: Japanese Patent Laid-Open Publication No. 2004-86958 (P. 8 to P. 21)

Patent Document 2: Japanese Patent Laid-Open Publication No. 2004-87192 (P. 6 to P. 15)

DISCLOSURE OF THE INVENTION

Problems to be Solved by the Invention

Conventional record players employ an arrangement where rotary drive of an electric motor is transmitted through an endless belt to rotate a turntable in one direction and to play a phonorecord mounted on the turntable. Accordingly, relatively small resistance is felt during an operation for rotating in the rotary direction of the turntable in DJ playing. On the other hand, when the turntable is rotated in a direction reverse to the rotary direction of the turntable, relatively great resistance is felt by a player.

However, in a conventional arrangement such as those described in the above Patent Documents 1 and 2, since the jog table are merely disposed in a rotatable manner, it is difficult to obtain operational feeling in accordance with operating mode. It is especially true in view of variation in DJ playing in recent years, where a demand for a reproduction device capable of giving operational feeling similar to an operational feeling in stopping rotation of turntable of a conventional record player has been increased.

An object of the present invention is to provide a switch device, an information-processing device and a reproduction device capable of obtaining excellent operational feeling.

Means for Solving the Problems

A switch device according to an aspect of the present invention includes: an operation unit that is moved by an input operation; a movement condition detector that recognizes a moving speed of the operation unit as a movement condition of the operation unit and outputs an operation signal in accordance with the movement condition; and a restricting unit that conducts at least one of a restriction processing for restricting the movement of the operation unit and an assistance processing for assisting the movement of the operation unit based on the operation signal in accordance with the movement condition of the operation unit.

An information processing device according to another aspect of the present invention includes: the switch device according to the above aspect of the present invention: an information acquiring unit that acquires information output by an output unit; and a processing unit that processes the information so that an output condition of the information output by the output unit is changed in accordance with the operation signal output by the signal output unit of the switch device.

A reproduction device according to further aspect of the present invention includes: an information-processing device according to the above aspect of the present invention; and an output unit for outputting the information processed by the information-processing device.

BRIEF EXPLANATION OF DRAWINGS

FIG. 20 is a flow chart showing how the reproduction processing is conducted in information-processing operation of the reproduction system according to the first embodiment; and FIG. 21 is a flow chart showing how the reproducing condition is changed in information-processing operation of the reproduction system according to the first embodiment.

Figure 1:
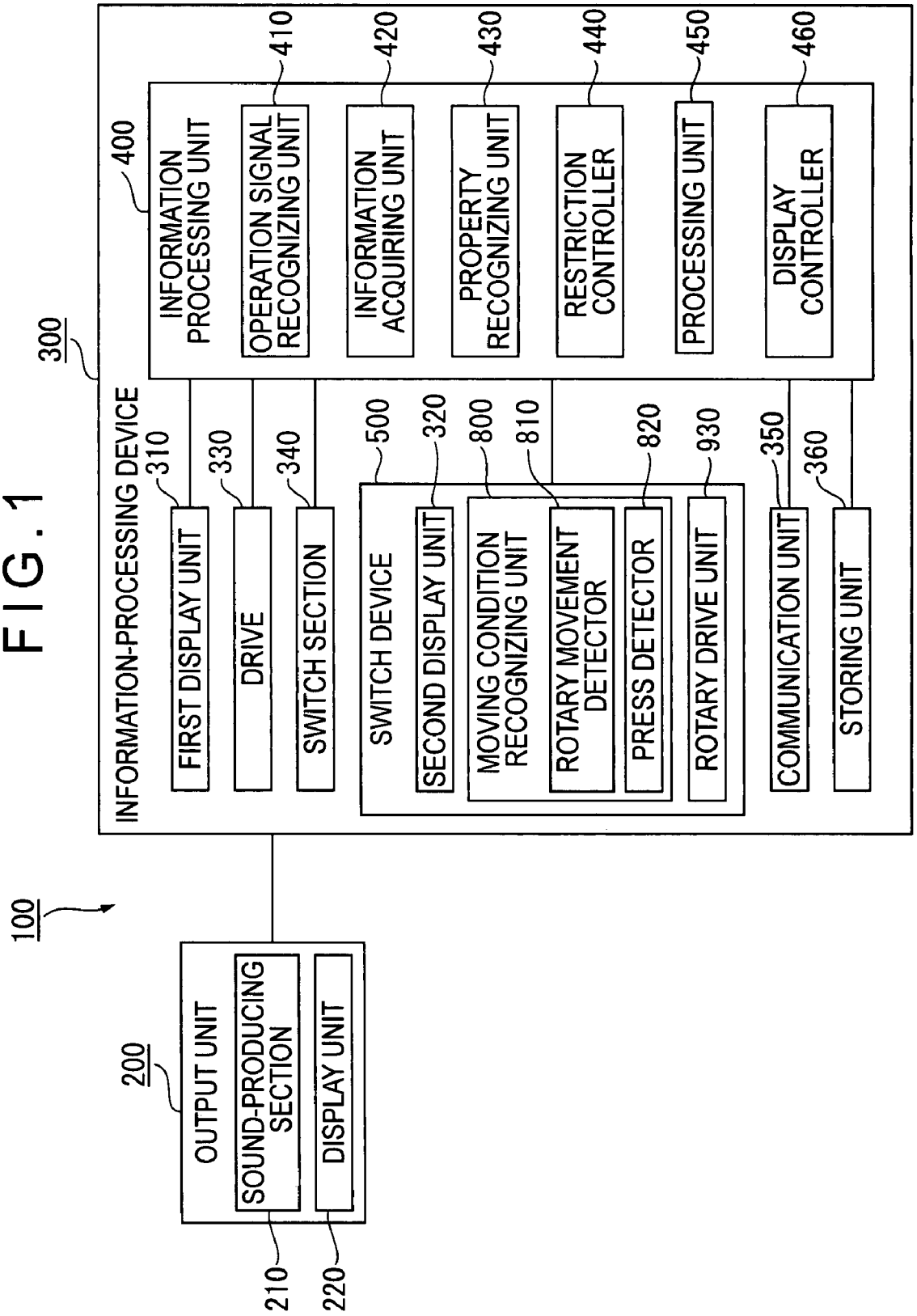
FIG. 1 is a block diagram showing a reproduction system according to a first embodiment of a reproduction device of the invention.

EXPLANATION OF CODES 100 reproduction system (reproduction device)
200 output unit
300 information-processing device
400 information-processing unit
420 information acquiring unit
430 property recognizing unit
440 restriction controller
500 switch device
600 rotating body (operation unit)
623 first gear (rack)
800 movement condition detector
812 detecting gear (pinion)
814 rotation-detecting sensor (detecting unit)
900 restricting unit
920 restricting gear (contact member)
930 rotary drive unit

BEST MODE FOR CARRYING OUT THE INVENTION

[Arrangement of Reproduction System]

An arrangement of a reproduction system as a reproduction device according to an embodiment of the invention will be described below with reference to FIG. 1. Incidentally, the switch device of the invention may be used in any switch arrangement other than those used for a reproduction system and those for processing any information.

In FIG. 1, 100 denotes a reproduction system, which reproduces information such as sound information relating to sound and music and image information relating to image and video. The reproduction system 100 includes an output unit 200 and an information-ice processing 200.

The output unit 200 output sound, music, image and video based on a signal output from the information-processing device 300. The output unit 200 includes a sound-producing section 210 and a display unit 220. The sound-producing section 210 includes a speaker (not shown). When the sound-generating unit 210 receives a signal corresponding to sound information from the information-processing device 300, the sound-generating unit 210 vocalizes and outputs the signal from the speaker after applying some processing such as amplification. On the other hand, after receiving signal corresponding to image information from the information-processing device 300, the display unit 220 processes and outputs the signal as an image or video on a display. The display unit 220 is, for instance, liquid crystal display panel, organic EL (Electro-Luminescence) panel, PDP (Plasma Display Panel), CRT (Cathode-Ray Tube), FED (Field Emission Display), electrophoresis display and the like.

The information-processing device 300 is a so-called DJ playback unit, which processes information recorded on a recording medium (not shown) in a manner capable of outputting by the output unit. Here, the "process" refers to information-processing corresponding to, for instance, an operation similar to playing music information on a phonorecord using a record player by a musician called a "disc jockey" (DJ). The recording medium includes detachable component including optical discs such as CD-DA (Compact Disc-Digital Audio), CD-ROM (Compact Disc-Read Only Memory), DVD-ROM (Digital Versatile Disc-Read Only Memory), DVD-R (Digital Versatile Disc-Recordable) and DVD-RW (Digital Versatile Disc-Rewritable), magnetic disc such as magneto-optical (MO) disc and hard-disc, memory card and IC (Integrated Circuit) card as well as semiconductor memory.

Figure 2:
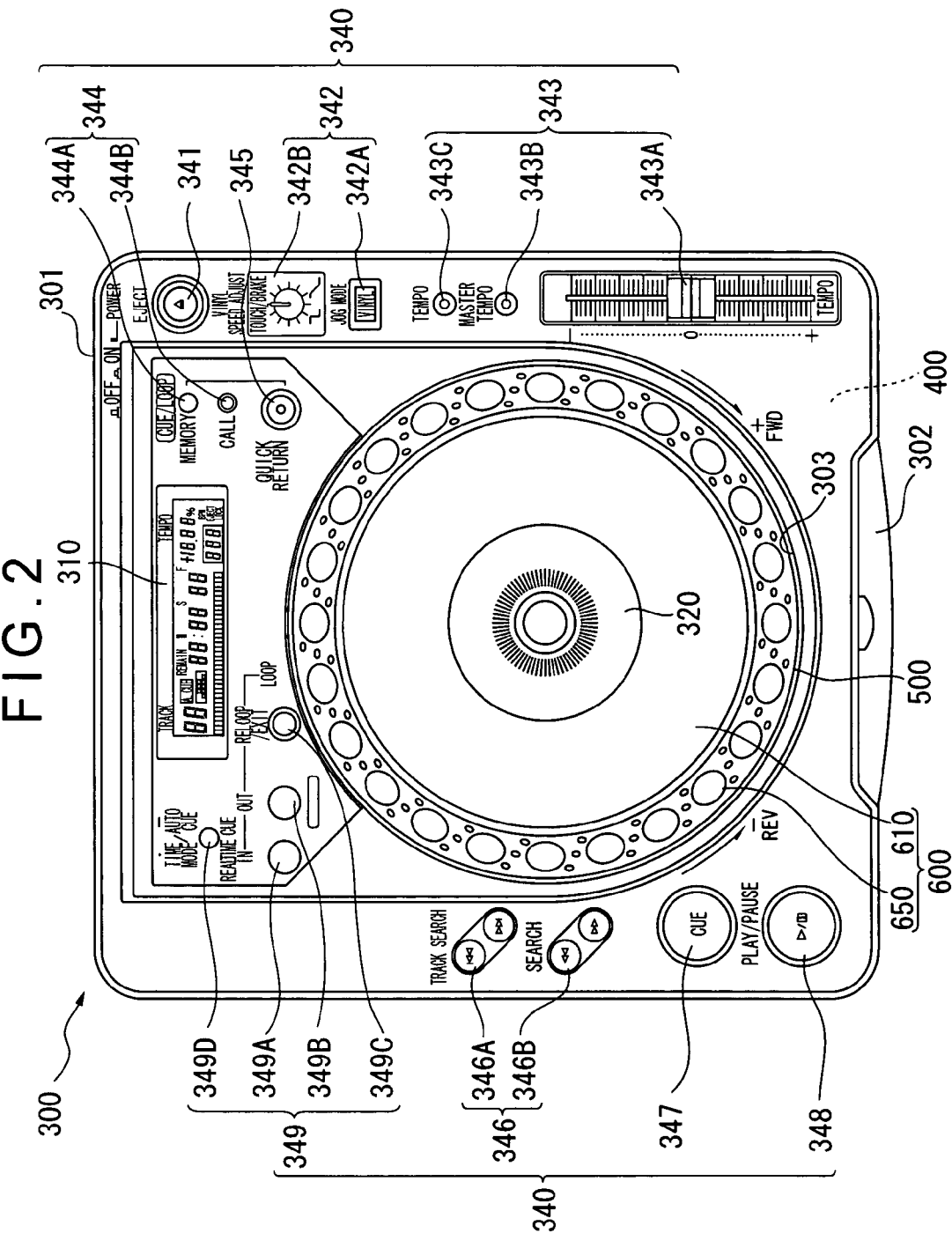
FIG. 2 is a plane view showing an information-processing device according to the first embodiment.
Figure 3:
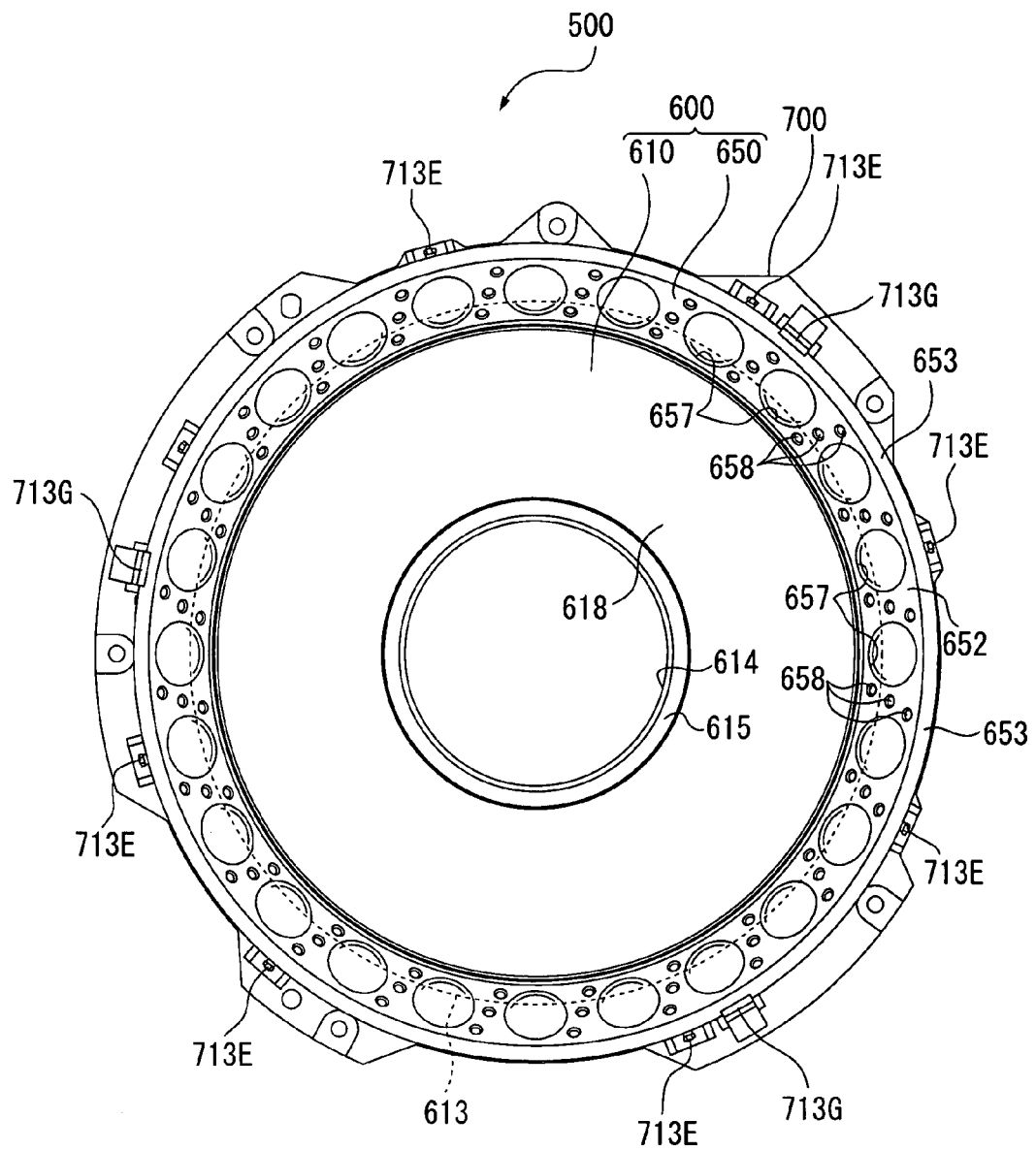
FIG. 3 is a plane view showing a switch device according to the first embodiment.
Figure 4:
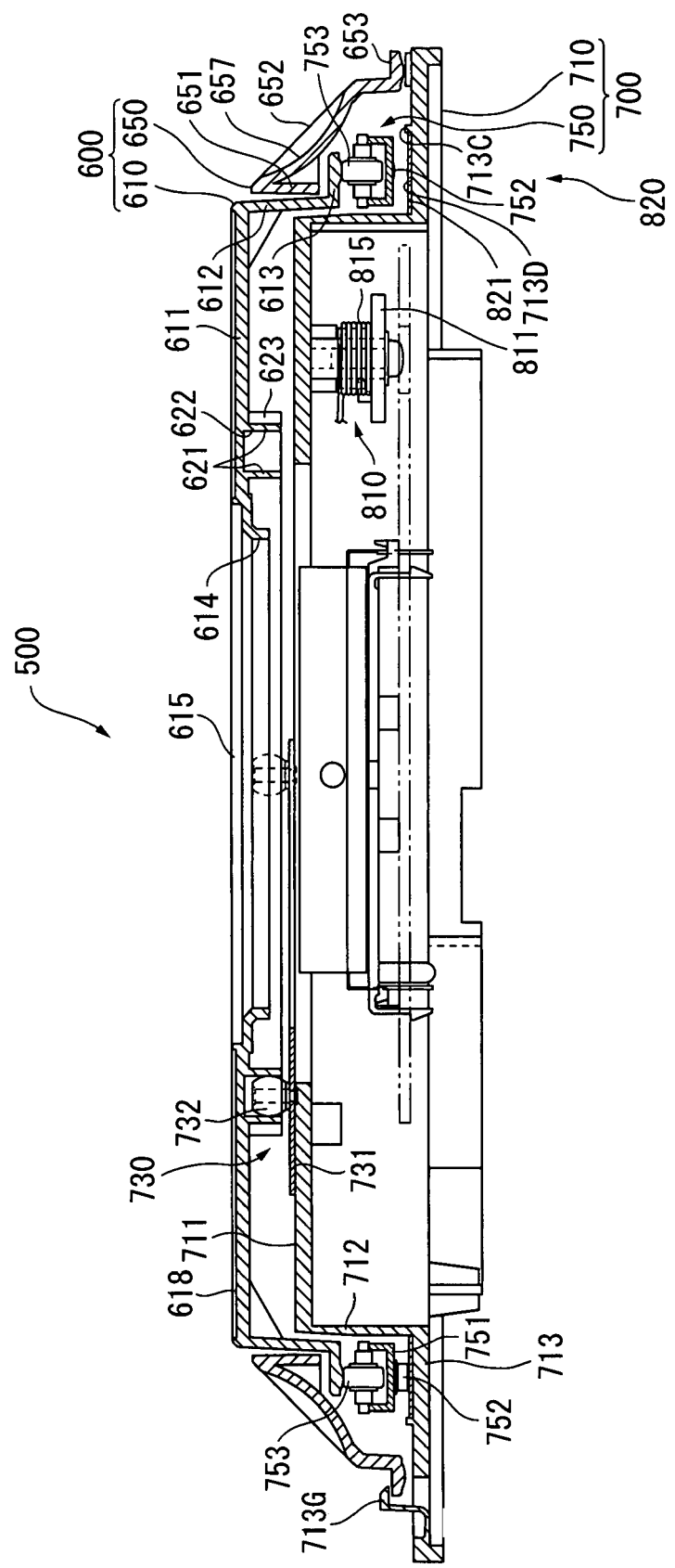
FIG. 4 is a side elevational cross section showing a switch device according to the first embodiment.

The information-processing device 300 has, as shown in FIG. 2, a body case 301 made of ABS (Acrylonitrile-Butadiene-Styrene) resin in substantially rectangular shape. An information-processing unit 400 for reproduction-processing, i.e. reading the information stored in the recording medium and outputting the information by the output unit 200, is provided in the body case 301. An insertion slot 302 opened in lateral direction is provided on a front side (first side: lower side in FIG. 2) of the body case 301. The insertion slot 302 is configured so that the recording medium is inserted thereinto to be loaded to the inside and the outside of the body case 301. The number of the insertion slot 302 may not be one and a plurality of the insertion slots may be provided corresponding to the type of different recording medium where available.

A substantially circular switch opening 303 is opened approximately at the center of a flat top side (the side shown in FIG. 2) of the body case 301 exposing large switch device 500 constituting the information-processing device of the present invention together with the information-processing unit 400. Also provided on the top side of the body case 301A are a plurality of various operation components for setting and inputting processing condition of the information-processing unit 400 and a first display unit 310 for showing processing condition of information.

(Arrangement of Switch Device)

Next, the switch device 500 according to the invention will be described below with reference to the drawings.

As shown in FIGS. 2 to 5, the switch device 500 is formed in a shape simulating a turntable of a record player for playing a phonorecord. The switch device 500 variably sets processing condition of information in accordance with input operation of a user. Specifically, when music information is processed for reproduction, the processing condition is variably set so that the reproducing condition of the music information such as reproducing speed, reproducing direction and stopping and restarting the reproduction of the music information is varied. The switch device 500 includes a rotating body 600 (operation unit constituting operating device), a support base 700, a moving condition detector 800 and a restricting unit 900.

As shown in FIGS. 2 to 6, the rotating body 600 includes a jog table 610 (moving section) and a jog ring 650 (peripheral cover as a part of support section). The jog table 610 and the jog ring 650 are made of, for instance, ABS resin having relatively high mechanical strength and being widely used for household electrical appliances and the like.

As shown in FIGS. 2 to 7, the jog table 610 is shaped substantially in a disc, which includes continuous arrangement of an approximately circular table plate 611 (top side section), a substantially cylindrical body section 612 having upper periphery continuous with the periphery of the table plate 611 and a flange 613 as a projection projecting outward in radial direction from the lower end of the body section 612. A substantially circular display window 614 is opened approximately at the center of the table plate 611. The display window 614 of the table plate 611 is covered with a translucent protection plate 615.

On the top side of the table plate 611 of the jog table 610, an antislip component 618 made of, for instance, relatively frictional component such as ring-shaped polycarbonate plate, rubber plate and the like is provided on the outer side of the protection plate 615. A pair of guide ribs 621 projects on a side of the jog table 610 (i.e. lower side of the table plate 611) to which the body section 612 projects in a double structure coaxially with the display window 614. A guide groove 622 partitions the guide ribs 621. A first gear 623 (rack) is provided on the outer circumference of the guide rib 621 located on the outer side. A plurality of stopper ribs 625 are provided in the circumferential direction on the outer circumference of the body section 612 of the jog table 312.

Further, the jog ring 650 is provided with an insertion cylinder 651, an operation surface 652 and an engaging flange 653, which is formed substantially in a ring. The insertion cylinder 651 is approximately in a cylinder having an inner diameter capable for the body section 612 of the jog table 610 to be inserted and incapable for the flange 613 of the jog table 610 to be inserted. A plurality of engaging cuts 654 for the engaging ribs 625 of the jog table 610 to be engaged is provided on the lower end in the axial direction of the insertion cylinder 651 in a manner corresponding to the position of the engaging ribs 625. The operation surface 652 is continuously formed obliquely outward and downward from an upper end of the insertion cylinder 651 to cover the insertion cylinder 651. Approximately spherical operation dents 657 are provided on the outer circumference of the operation surface 652 approximately at regular interval. A plurality of (three, for instance) approximately linearly-arranged cylindrical operation bulges 658 are provided on the outer circumference of the operation surface 652 at a position between the operation dents 657. The engaging flange 653 continuously extends from the lower end of the operation surface 652 to the outside to be projected.

On the other hand, the support base 700 includes a mount 710 and a rotating section 750 as shown in FIGS. 2 to 5 and 8 to 10. The mount 710 rotatably supports the rotating body 600. The rotating section 750 smoothly guides the rotation of the rotating body 600 supported by the mount 710.

The mount 710 is provided. The mount 710 is made of, for instance, ABS resin having relatively high mechanical strength and being widely used for household electrical appliances and the like. The mount 710 is shaped substantially in a disc, which includes continuous arrangement of an approximately circular top board 711, a substantially cylindrical cylinder section 712 having upper periphery continuous with the periphery of the top plate 711 and a flange 713 projecting outward in radial direction from the lower end of the cylinder section 712.

Approximately square opening 721 is opened approximately at the center of the top plate 711 of the mount 710 and a rotation detecting window 722A and rotation restricting window 722B are opened around the periphery of the top plate 711. A plurality of board attaching ribs 724 that projects downward and receives a circuit board 723 are provided on the lower side of the top plate 711. A second display unit 320 coupled with the information processing unit 400 to display the information-processing condition is installed on the circuit board 723 so that display surface thereof is aligned with the opening 721 of the top plate 711.

A rotary guide 730 for guiding the rotation of the jog table 610 of the rotating body 600 is provided on the upper side of the top plate 711 at a corner of the opening 721. The rotary guide 730 is made of highly corrosion-resisting metal plate of stainless steel and the like and has an approximately L-shape having longitudinal direction approximately in perpendicular direction. The rotary guide 730 is provided with an attachment plate 731 to be positioned and attached at a predetermined position on the top plate 711. Approximately spherical rollers 732 made of brass and the like are respectively rotatably supported on both ends of the longitudinal direction of the attachment plate 731. The rotary guide 730 is attached and fixed on the top plate 711 so that a position where the distance from the rotation center of the rollers 732 is equal coincides with the position corresponding to the center of the table plate 611 of the jog table 610. For instance, the rotary guide 730 is attached so that the apex of isosceles right triangle having hypotenuse of segment connecting the rotation centers of the roller 732 is located at the center of the top plate 711.

The rollers 730 of the attached rotary guide 730 engage with the guide groove 622 of the jog table 610, thereby rotatably supporting the jog table 610 in a manner that the rotation center of the rotating body 600 is located at the center of the mount 710. Incidentally, the attachment plate 731 may not be stainless steel plate but may be made of any metal plate. It is especially preferable to employ an anticorrosive material or a material processed with anticorrosive treatment. Further, the attachment plate 731 may not be metal but synthetic resin having high mechanical strength such as engineering plastic may be used. The rotary guide 730 may be arranged in any manner as long as the rotating body 600 can be rotatably supported, where the roller 732 may be directly supported by the top plate 711 without employing the attachment plate 731, a plurality of the rollers 732 may be provided instead of the pair of rollers 732, and a plurality of rollers may be provided in a manner having rotation axis in radial direction relative to the top plate 711.

A plurality of recessed portions 712A are provided on the outer circumference of the cylinder section 712 of the mount 710. Further, a wiring window 712B intercommunicating the inner circumference of the cylinder section 712 to the outer circumference thereof is provided on the cylinder section 712. A screw stopper rib 713A and a guide pin 713B are provided on the flange 713 of the mount 710 within the dent 712A. A concentric cylindrical wiring rib 713C is provided on the outer circumference of the cylinder section 712 provided along the circumference of the cylinder section 712 on the flange 713. A dented wiring groove 713D is partitioned between the cylinder section 712 and the wiring rib 713C. A plurality of first rollers 713E are coaxially arranged on the flange 713 in a manner rotatably supported so that rotation axis direction radially extends relative to the center of the cylinder section 712.

A plurality of abutting ribs 713F are concentrically disposed and projected from the flange 713. The abutting rib 713F projects from the upper side of the flange 713 at a height lower than a plane constituted by an outer circumference of the plurality of first rollers 713E. The engaging flange 653 of the jog ring 650 abuts onto the outer circumference of the first roller 713E so that the jog ring 650 is rotatably supported on the plurality of first rollers 713E together with the jog table 610 while the rotation center thereof is located at the center of the mount 710.

Incidentally, the engaging flange 653 of the jog ring 650 does not usually abuts onto the abutting rib 713F and the like, which is in contact with the abutting rib 713F in accordance with deformation of respective components when strong force is applied from the above and the like. Accordingly, the damage on the respective components on account of strong external force can be prevented. Further, a plurality of guide claws 713G is concentrically provided on the flange 713 to be engaged with the outer periphery of the engaging flange 653 of the jog ring 650 to prevent detachment from the mount 710.

The rotating section 750 rotatably supports the jog table 610 of the rotating body 600. The rotating section 750 is formed approximately in a ring corresponding to the wiring groove 713D of the mount 710. On a side opposing to the flange 713 of the mount 710 of the rotating section 750, a plurality of pressing bulges 751 bulging substantially spherically in the opposing direction, and a plurality of elastically deformable cushion members 752 made of rubber, high-density micro-cell urethane foam, coil spring member and the like.

Further, a plurality of second rollers 753 having outer circumference abutting to the lower side of the flange 613 of the jog table 610 of the rotating body 600 with the rotation center thereof being radially located to support the jog table 610 is provided on the rotating section 750. The rotating section 750 also has a plurality of support pieces 754 that project from the inner edge toward inside in a tongue-shape corresponding to the recessed portion 712A of the mount 710. The support pieces 754 are screwed to the screw-stopper rib 713A and the guide pin 713B of the mount 710 in a manner penetrating in the axial direction and incapable of detachment on account of restoration force of coil spring 713H (biasing unit) and the like disposed on the screw-stopper rib 713A. When attached, the cushion member 752 and the pressing bulge 751 are not in contact with the flange 713 of the mount 710. The cushion member 752 is brought into contact by the pressing operation of the rotating body 600 for elastically deforming the coil spring 713H, and further pressing operation brings the pressing bulge 751 into contact.

On the other hand, the moving-condition detector 800 recognizes the moving condition of the rotating body 600 such as inclination and press-down movement in accordance with input operation such as rotation and pressing by a user. The moving-condition detector 800 is coupled with the information-processing unit 400 and the like to output the signal relating to the recognized moving condition to the information-processing unit 400. The output unit 800 includes a rotary movement detector 810 and a press detector 820.

As shown in FIGS. 8 to 12, the rotary movement detector 810 is disposed on the lower side of the top plate 711 of the mount 710 confronting the rotation detecting window 722A. The rotary movement detector 810 includes an attachment base plate 811, a detecting gear 812 (pinion), a rotation-detecting plate 813 and a rotation-detecting sensor 814 (detecting unit).

The attachment base plate 811 is an elongated plate having one end in longitudinal direction being supported on the lower side of the top plate 711 and the other end in the longitudinal direction being rotatably supported. The detecting gear 812 is rotatably supported on the other end of the attachment base plate 811 in the longitudinal direction so that rotary shaft thereof is aligned with the thickness direction of the attachment base plate 811. When the attachment base plate 811 is placed on the top plate 711, the detecting gear 812 is exposed from the rotation detecting window 722A to the upside of the top plate 711 to be engaged with the first gear 623 of the jog table 610 to be rotated in accordance with the rotation of the jog table 610.

The rotation-detecting plate 813 is a disc of translucent synthetic resin having diameter greater than the diameter of the detecting gear 812, on which a plurality of band scales 813A are printed. The rotation-detecting plate 813 is integrally attached on the detecting gear 812 in substantially coaxial manner. The rotation-detecting sensor 814 includes an optical sensor 814A that detects the band scale 813A of the rotation-detecting plate 813 and a detection circuit board 814B on which a circuit for acquiring the output signal from the optical sensor 814A and outputting a predetermined detection signal (operation signal) corresponding to the operation is provided. The rotation-detecting sensor 814 is attached on the attachment base plate 811 to be aligned with the thickness direction of the rotation-detecting plate 813 so that the optical axis of the optical sensor 814A is located on the outer part of the rotation-detecting plate 813 on which the band scale 813A is printed.

The rotation-detecting sensor 814 detects the rotary speed and the rotary direction of the rotation-detecting plate 813 and outputs the detection signal toward the information-processing unit 400. The rotary movement detector 810 is disposed in a manner that, when an abrupt rotation is applied onto the detecting gear 812 from the first gear 623 on account of rapid rotation of the jog table 610, the other end in the longitudinal direction of the attachment base plate 811 is rotated outward from the first gear 623 against the biasing of the torsion coil spring 815 to escape the detection gear 812.

Incidentally, it is possible to arrange the rotation-detecting sensor 814 in any manner other than those described above. For instance, it is possible to employ any arrangement as long as the rotary condition of the rotating body 600 can be detected, where the band scale 813A of the rotation-detecting plate 813 is printed with a magnetic ink and a magnetic sensor for detecting magnetic force is employed, the rotation of the detecting gear 812 is directly detected with an optical sensor 814A and a magnetic sensor by providing a reflector member or a magnet on a part of the outer circumference of the detecting gear 812 without employing the rotation-detecting plate 813, or alternatively, without employing the first gear 623 and the detecting gear 812, reflector member or magnet is provided on the jog table 610 and the rotating condition of the jog table 610 is directly detected with the optical sensor 814A or a magnetic sensor.

As shown in FIGS. 9, 10 and 15 to 18, the press detector 820 of the moving-condition detector 800 includes a tape switch 821 disposed in the wiring groove 713D of the mount 710. The tape switch 821 includes a plurality of switches 821A (membrane switch and the like) at a position opposing to the press bulge 751 of the rotating section 750.

The press detector 820 recognizes pressing movement of the rotating section 750 when the rotating body 600 is pressed and the switch 821A is closed by the pressing bulge 751 of the rotating section 750 that is pressed down together with the jog table 610 against the restoration force of the coil spring 713H and the cushion member 752, thereby recognizing the input operation of the pressing by the information-processing unit 400 coupled thereto.

Incidentally, it is possible to employ any arrangement for the press detector 820 other than a contact-point type having the switch 821A as long as the pressing of the jog table 610 pressed down by a more than predetermined pressing operation of the rotating body 600, which includes an arrangement having a pressure-sensitive sensor or piezoelectric element, an arrangement having a plurality of sensors at a position opposing to the pressing bulge 751 and an arrangement having a plurality of pressure-sensitive sensors or piezoelectric elements on the table plate 611 of the jog table 610. Further, it is possible that voltage corresponding to the pressing force during the press input operation is output toward the information-processing unit 400 with the use of piezoelectric elements, thereby also recognizing pressing condition.

Figure 8:
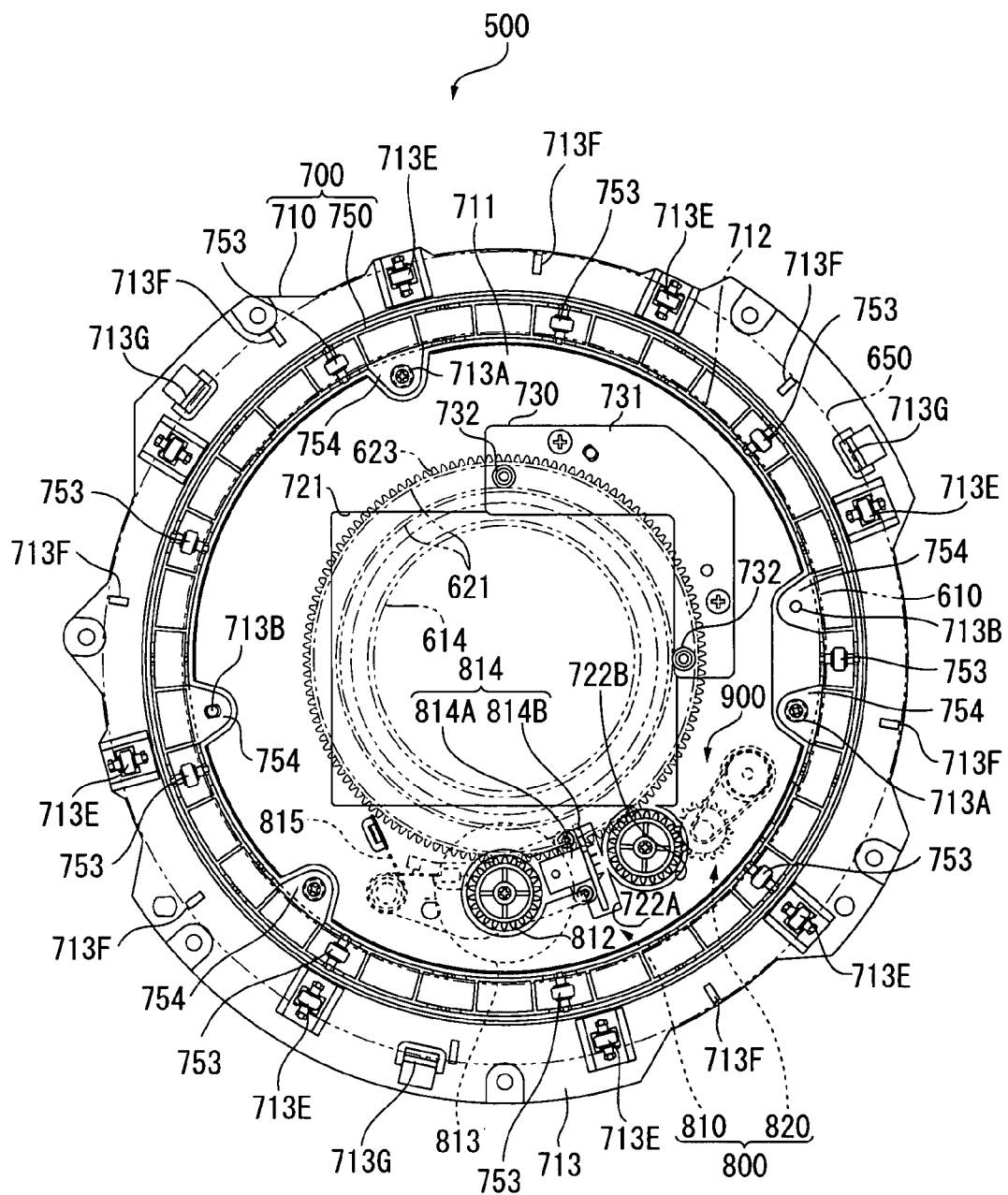
FIG. 8 is a plane view showing a relationship between the rotating body and a rotation detector in the first embodiment with reference to the condition in which the rotating body is detached.
Figure 9:
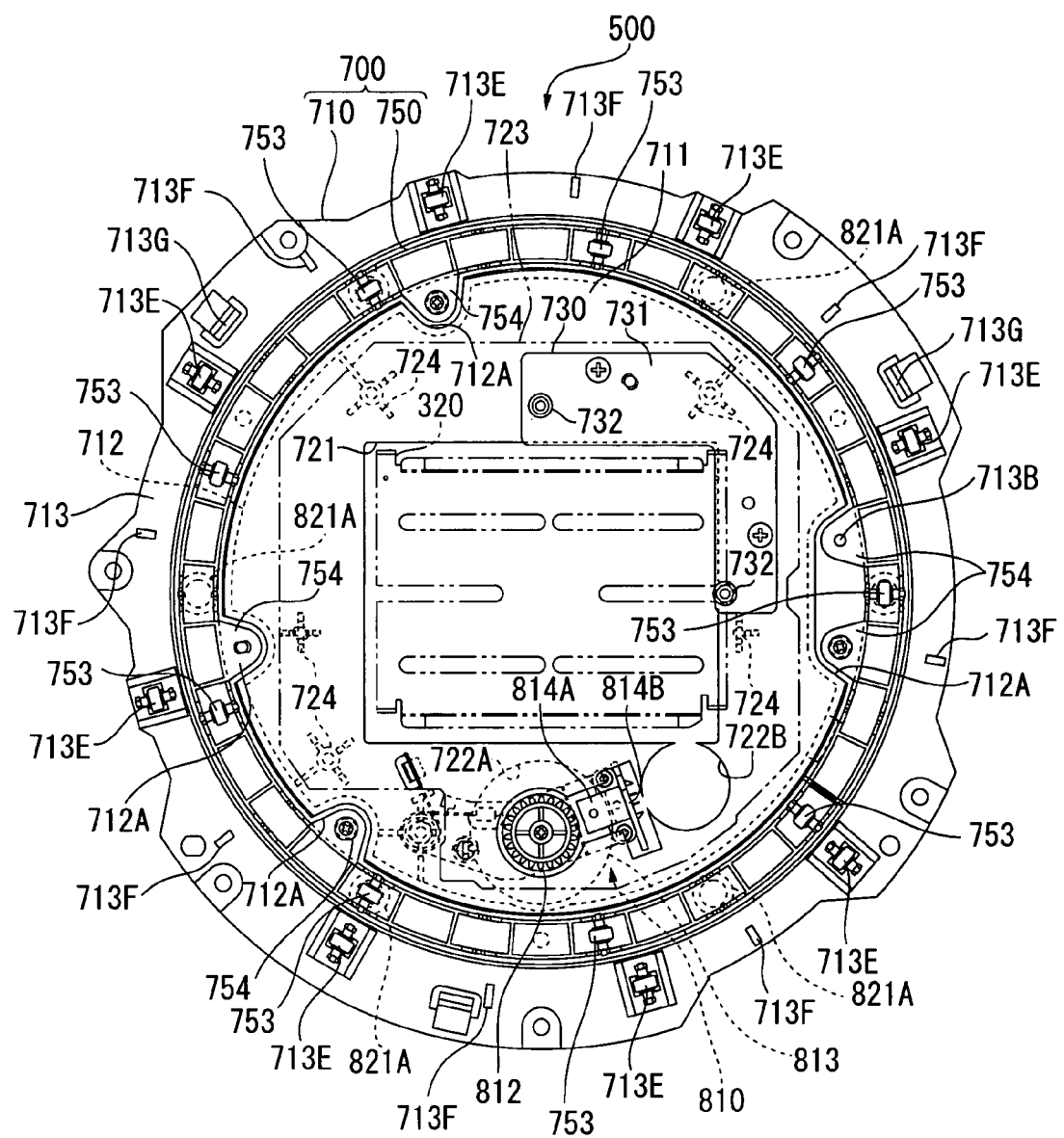
FIG. 9 is a plane view showing an arrangement of a circuit board in the first embodiment with reference to the condition in which the rotating body is detached.
Figure 10:
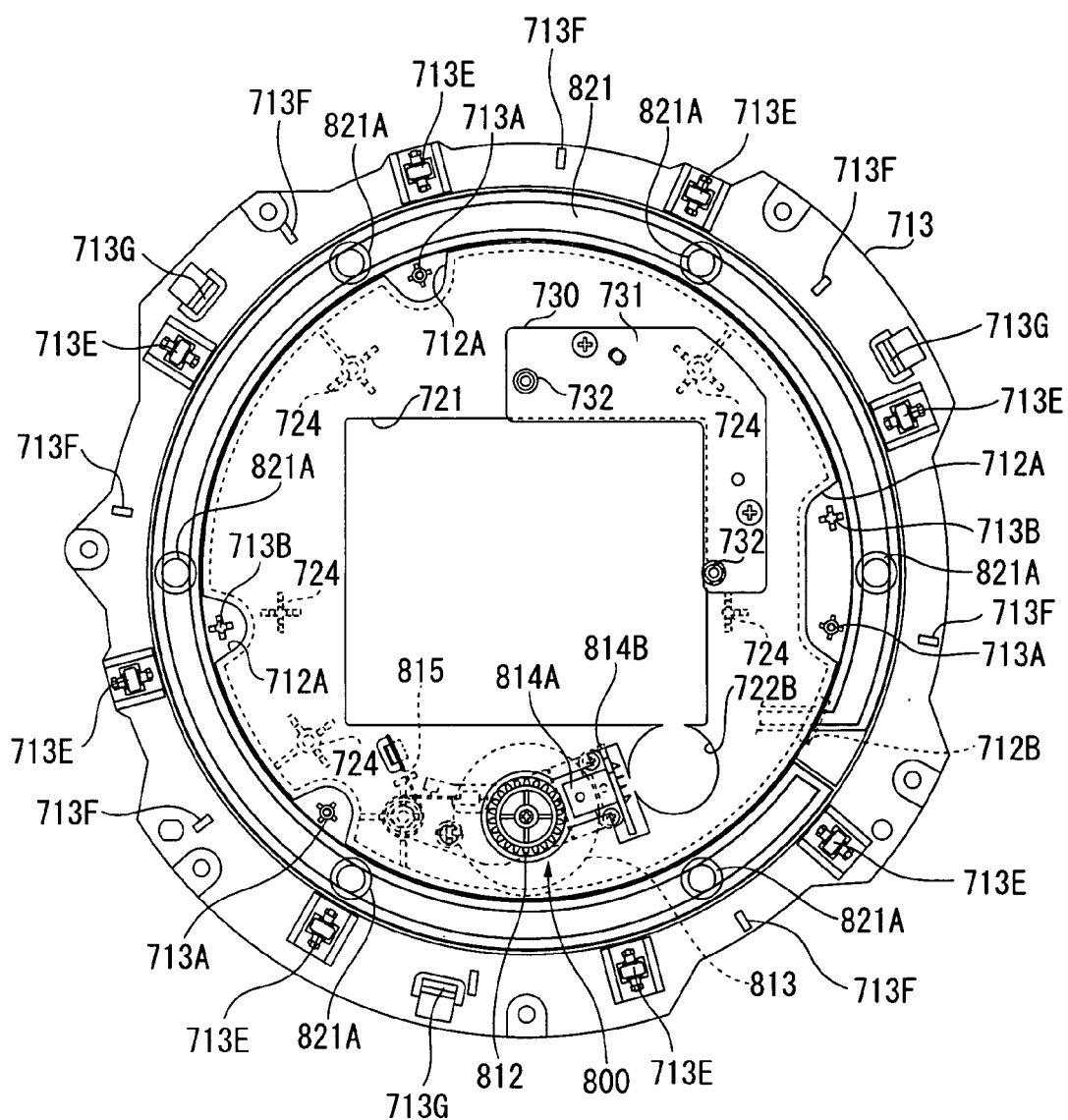
FIG. 10 is a plane view showing a switch device in the first embodiment with reference to the condition in which the rotating body and a rotating section are detached.
Figure 11:
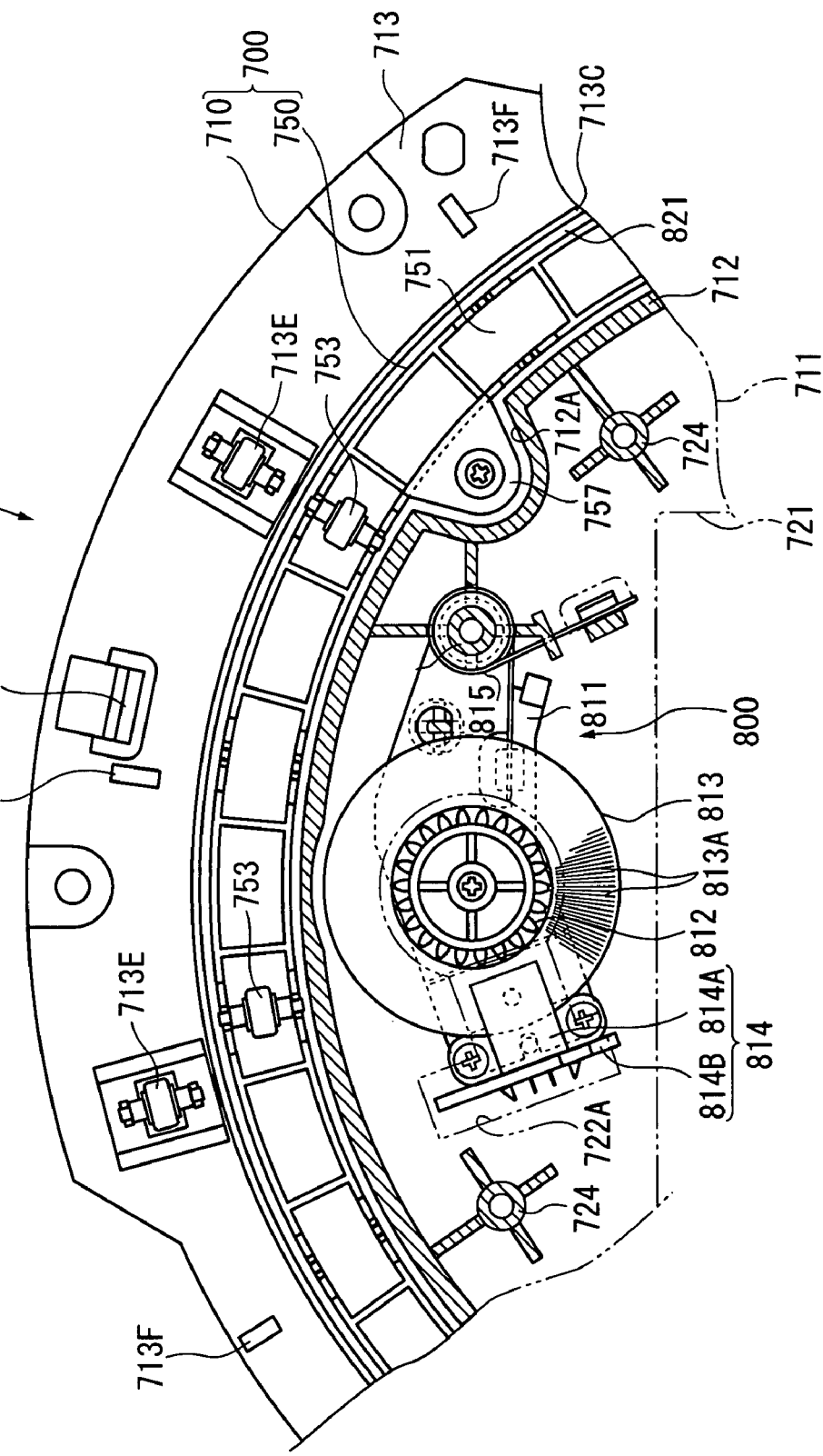
FIG. 11 is a plane sectional view showing a part near the rotation detector in the first embodiment with reference to the condition in which the rotating body of the switch device is detached.
Figure 12:
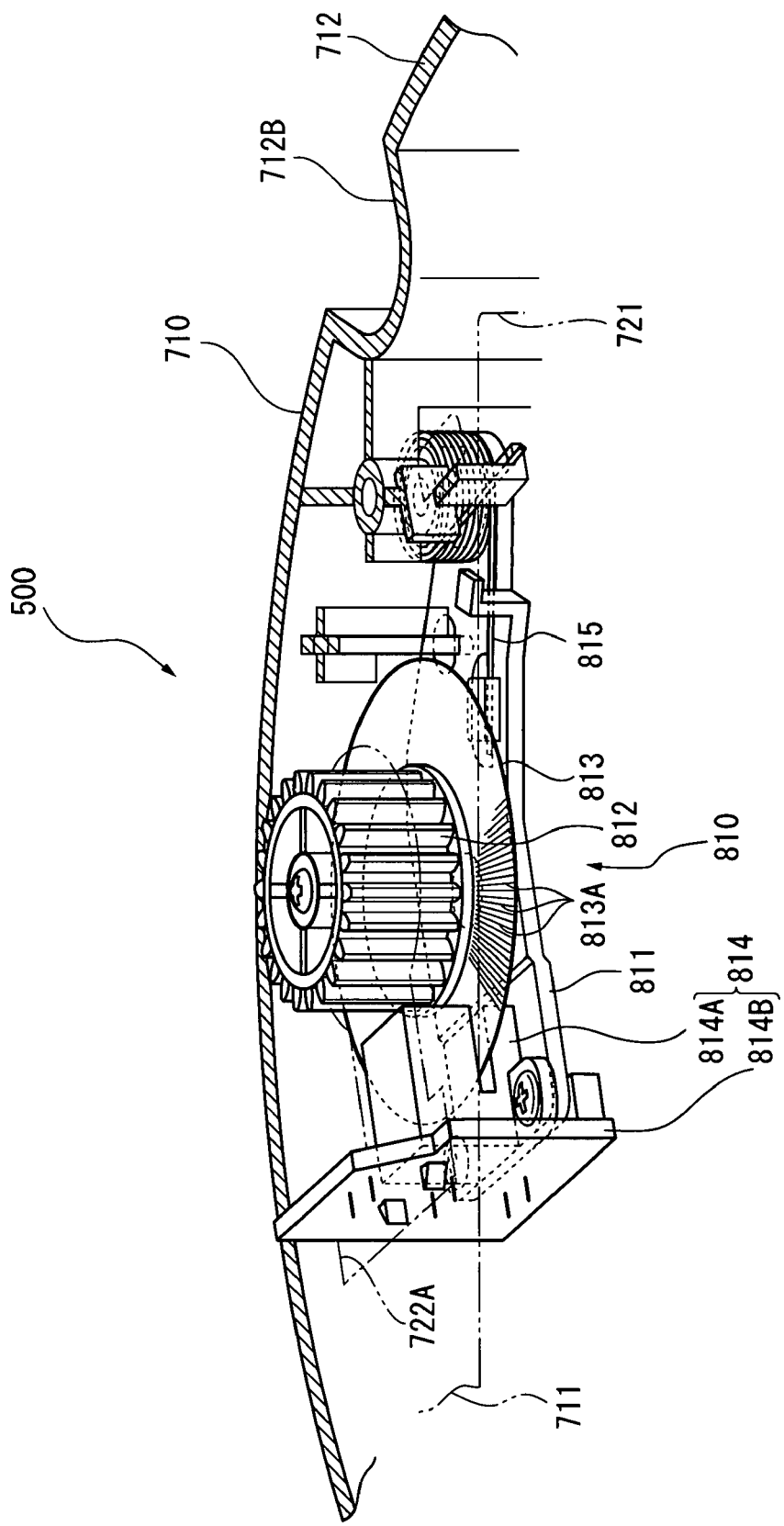
FIG. 12 is a perspective view showing a part near the rotation detector in the first embodiment with reference to the condition in which the rotating body of the switch device is detached and the base is cut out.
Figure 13:
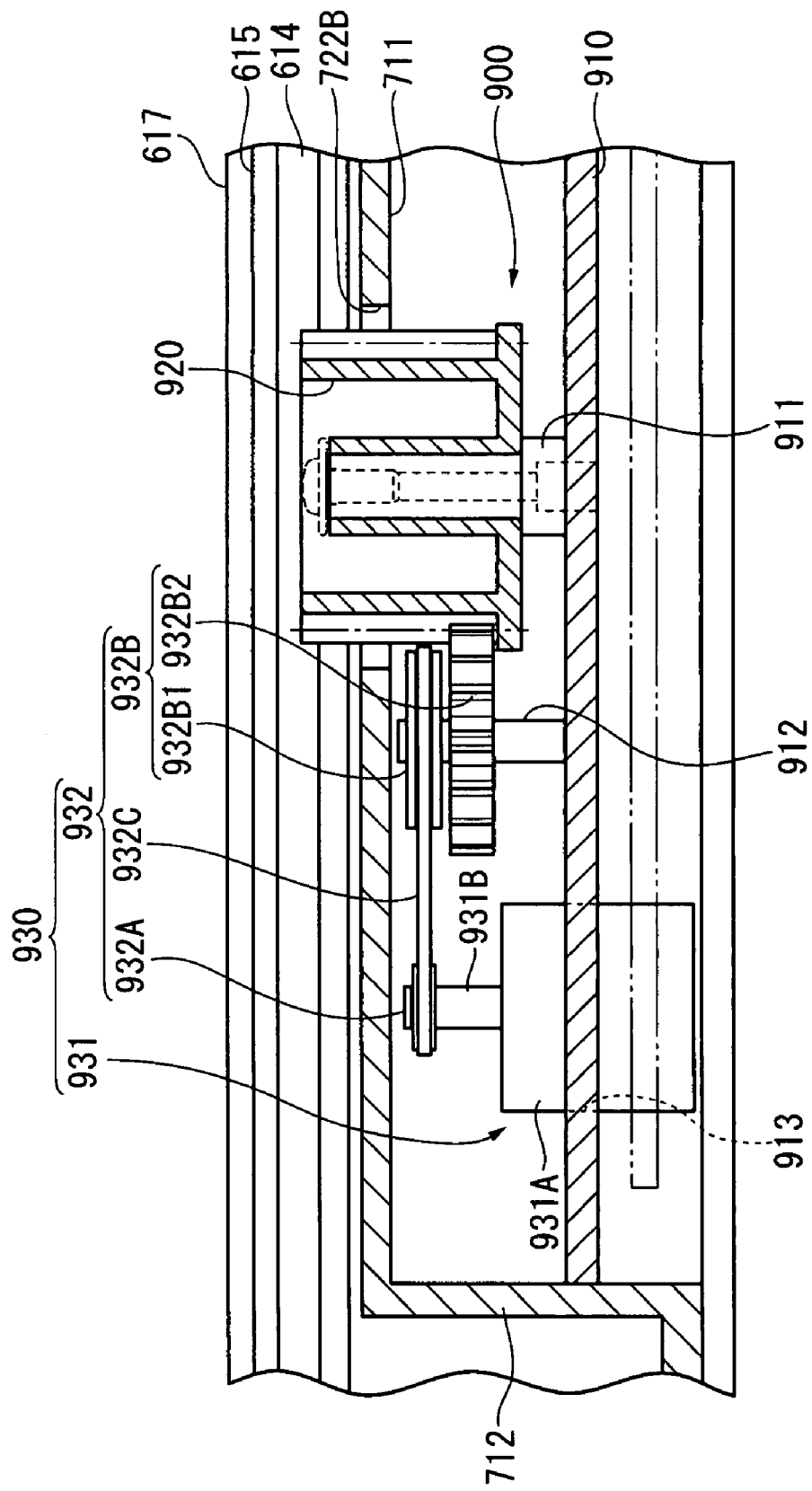
FIG. 13 is a sectional side elevation taken at a position of a restricting unit of the switch device according to the first embodiment.
Figure 14:
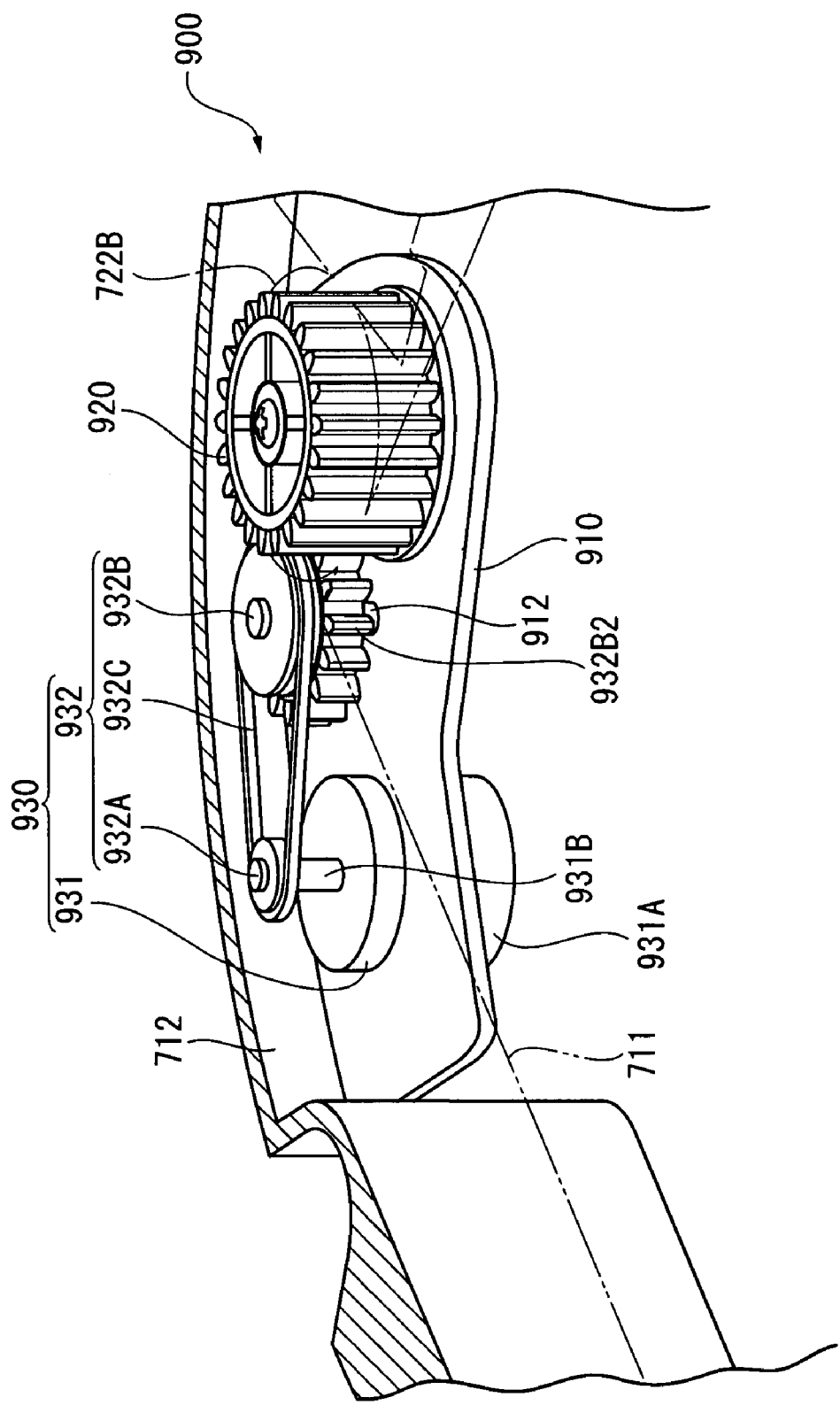
FIG. 14 is a perspective view showing a part near a restricting unit in the first embodiment with reference to the condition in which the rotating body of the switch device is detached and the base is cut out.
Figure 15:
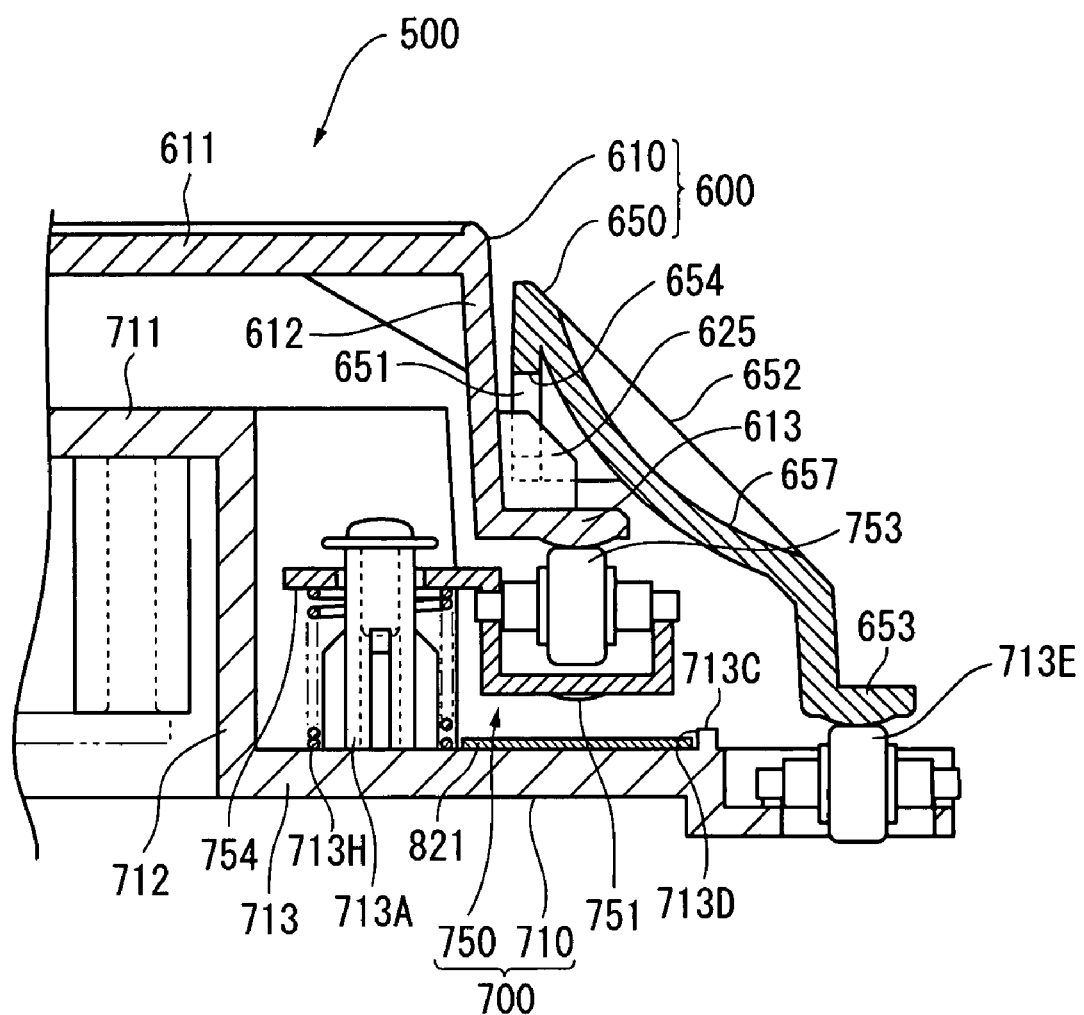
FIG. 15 is a sectional side elevation showing a part near a screw-stopping rib of the switch device according to the first embodiment.
Figure 16:
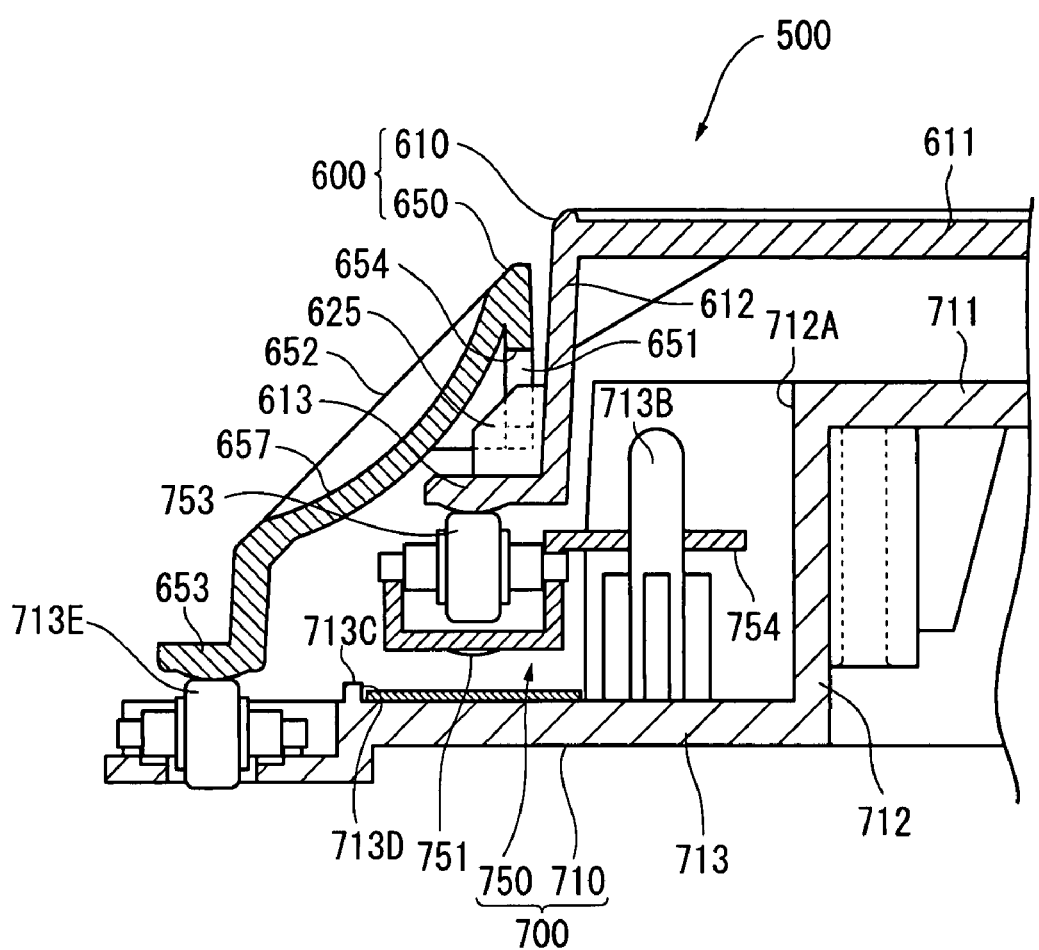
FIG. 16 is a sectional side elevation showing a part near a guide pin of the switch device according to the first embodiment.
Figure 17:
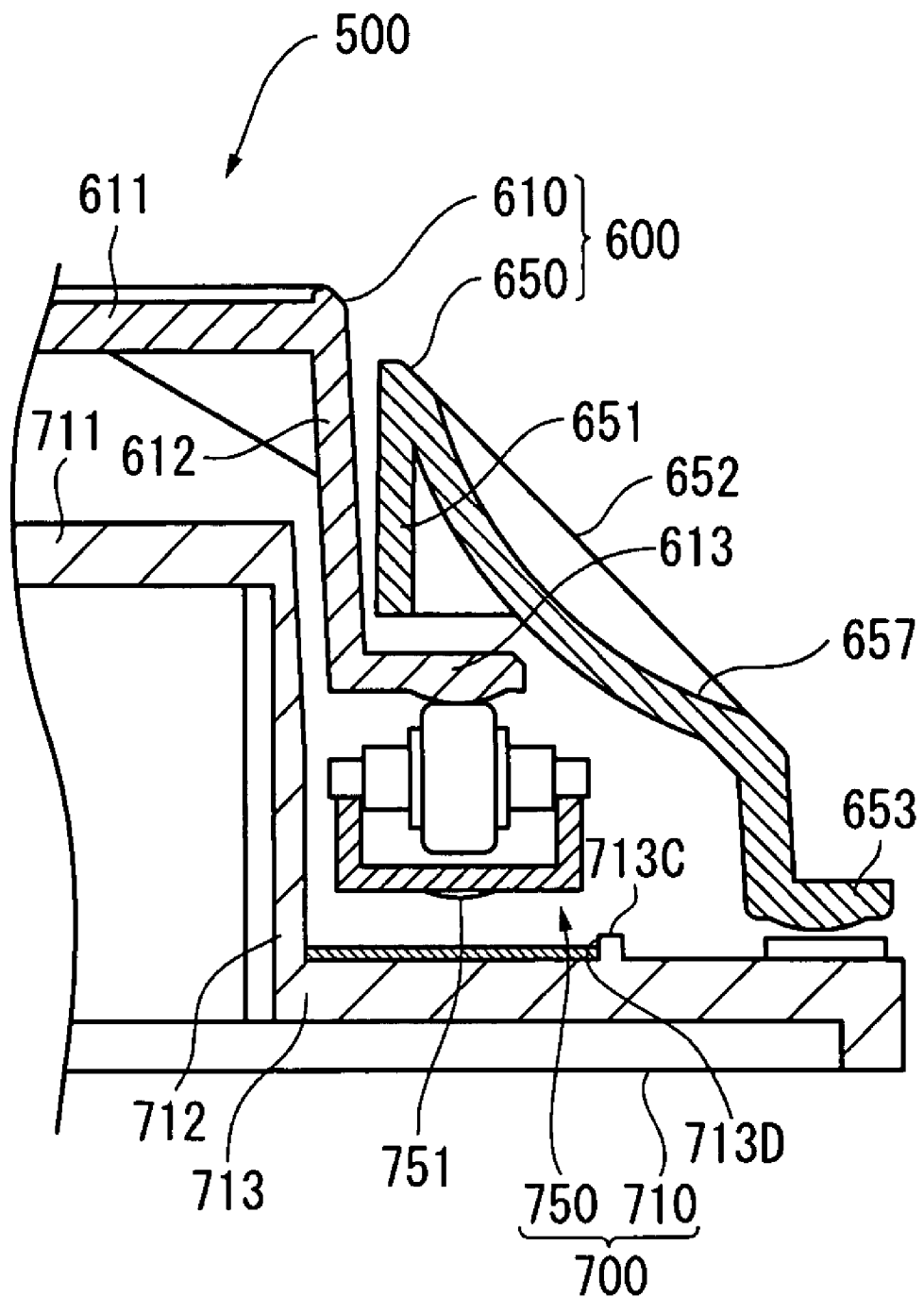
FIG. 17 is a sectional side elevation showing a part near a pressing bulge of the switch device according to the first embodiment.
Figure 18:
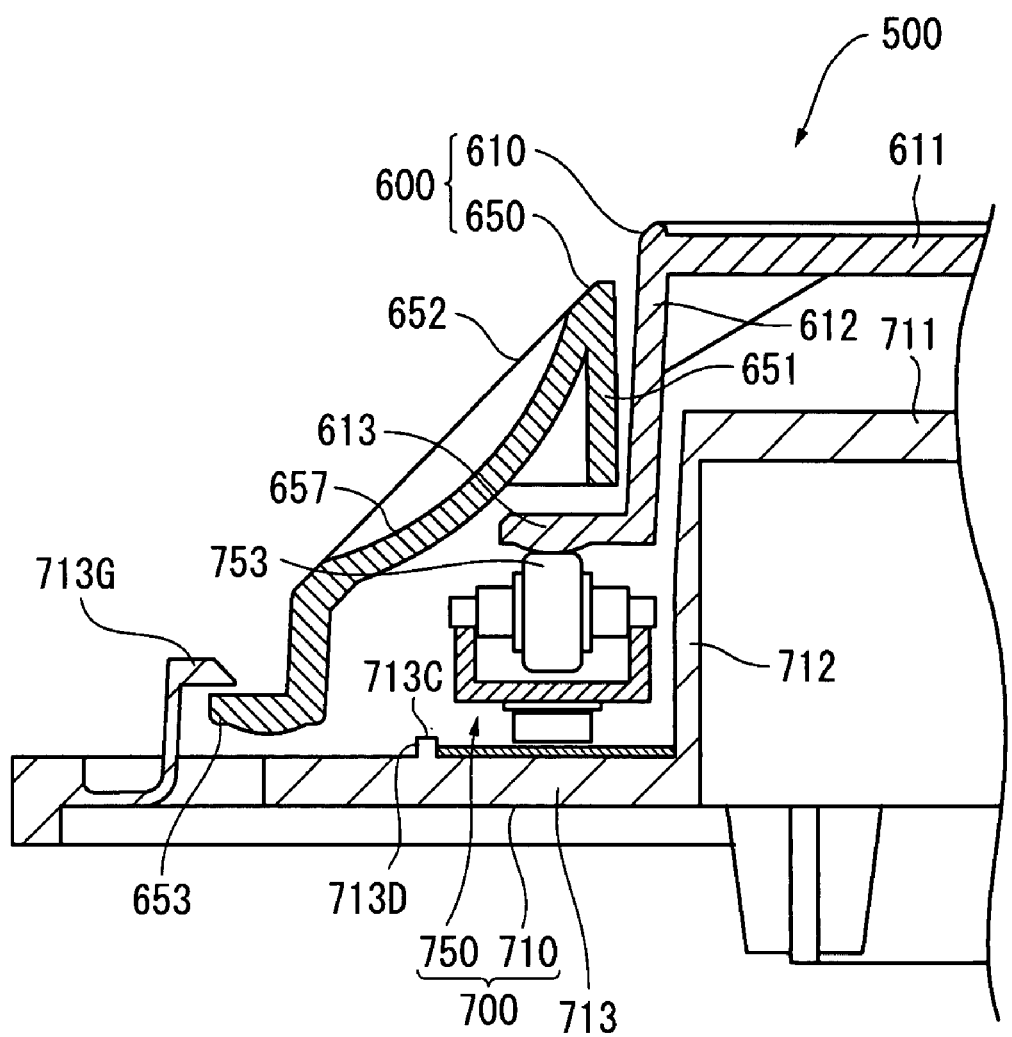
FIG. 18 is a sectional side elevation showing a part near a cushion member of the switch device according to the first embodiment.

As shown in FIG. 8 and FIGS. 13 and 14, the restricting unit 900 is disposed on the lower side of the top plate 711 of the mount 710 confronting the rotation restricting window 722B. The restricting unit 900 is coupled with the information-processing unit 400 to restrict the rotary movement of the rotating body 600 rotated by an input operation in accordance with the control by the information-processing unit 400. The restricting unit 900 includes an attachment base 910, a restricting gear 920 and a rotary drive unit 930. The rotary drive unit 930 includes an electric motor 931 and a drive transmitter 932. The drive transmitter 932 includes an output pulley 932A, an intermediate rotating body 932A and an endless belt 932C.

The attachment base 910 is a longitudinal plate, which is attached and fixed on the lower side of the top plate 711 of the mount 710. Projected from the attachment base 910A is a first support shaft 911 that is located on an end in the longitudinal direction and having an axial direction aligned with the thickness direction of the attachment base 910 and a second support shaft 912 that is located on the middle portion in the longitudinal direction and having an axial direction approximately parallel to the first support shaft 911. A penetrating hole 913 is provided on the other end in the longitudinal direction of the attachment base 910. A restricting gear 920 is rotatably supported on the first support shaft 911 of the attachment base 910. An intermediate rotating body 932B is supported on the second support shaft 912 in a rotatable manner.

The intermediate rotating body 932B is configured by coaxially and integrally connecting an intermediate pulley 932B1 and an intermediate gear 932B2. A main body 931A of the electric motor 931 is fitted and fixed into the through hole of the attachment base 910. The endless belt 932C is wound on the intermediate pulley 932B1 of the intermediate rotating body 932B and the output pulley 932A integrated with an output shaft 931B of the electric motor 931 and having diameter smaller than the intermediate pulley 932B1.

Figure 5:
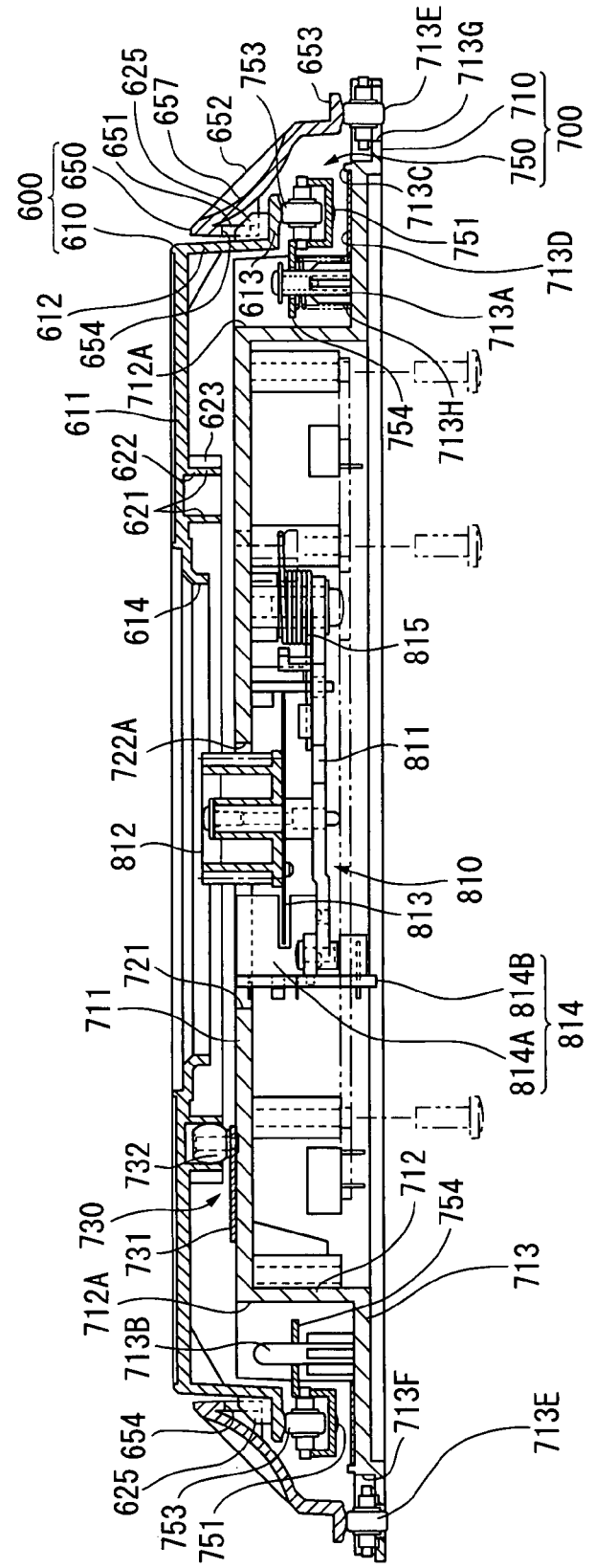
FIG. 5 is a sectional side elevation showing the switch device of the first embodiment, in which a position for a rotary drive unit to be disposed is cut out.
Figure 6:
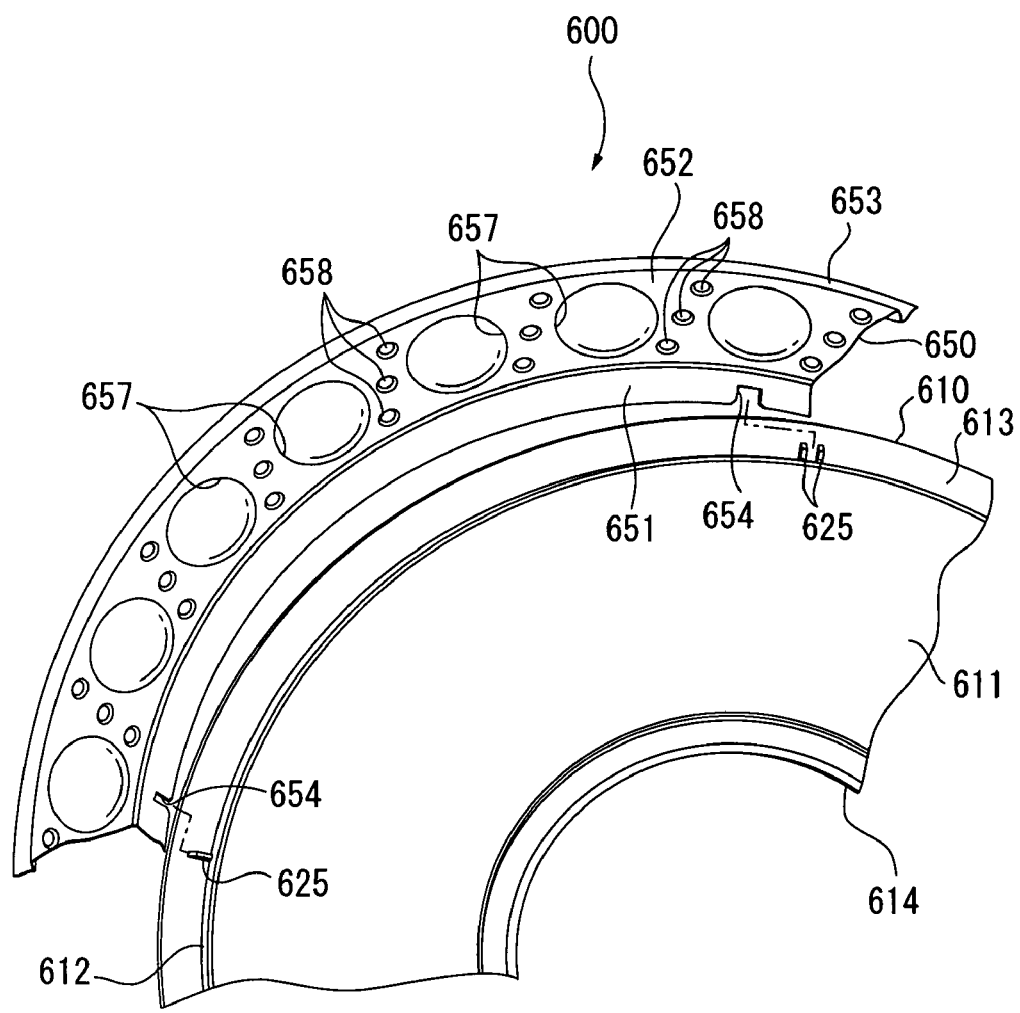
FIG. 6 is an exploded perspective view showing a part of a rotating body of the first embodiment.
Figure 7:
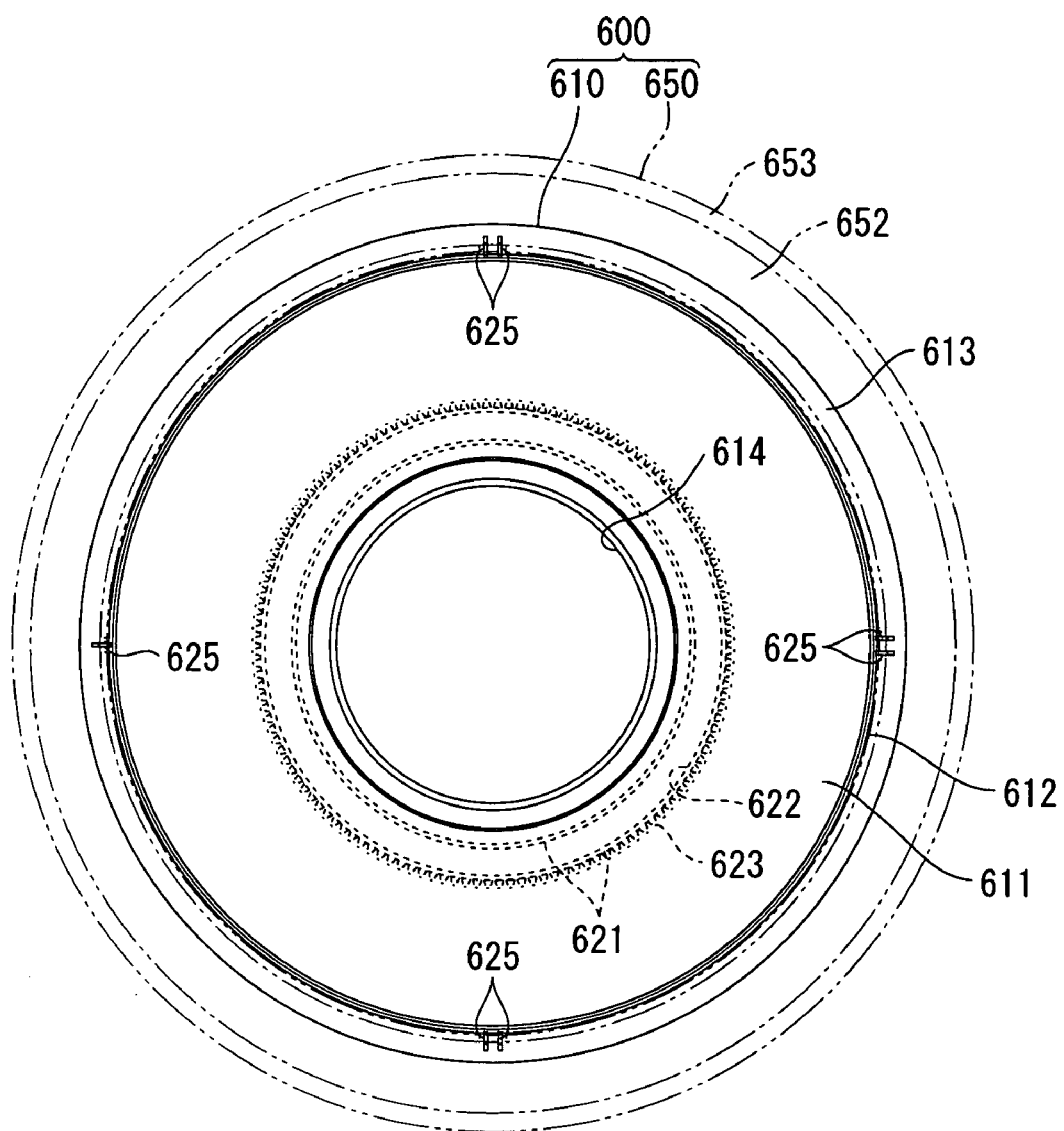
FIG. 7 is a plane view showing a jog table according to the first embodiment.

An arrangement for preventing idling rotation, i.e. irregularities and the like is preferably provided on the outer circumference of the inner circumference of the endless belt 932C and the outer circumference of the intermediate pulley 932B1. Though the intermediate pulley 932B1 having diameter smaller than that of the intermediate gear 932B2 is illustrated in FIGS. 5 and 13 for the convenience of explanation, other arrangement is possible. For instance, the intermediate rotating body 932B may be arranged by providing the intermediate pulley 932B1 and the intermediate gear 932B on both sides of the attachment base 910, where the restricting gear 920 is engaged on one side and the endless belt 932C is wound on the other side. According to such an arrangement, the diameter of the intermediate pulley 932B1 can be made larger than that of the intermediate gear 932B2, so that an arrangement can be easily attained where the rotation number of the output shaft 931B of the electric motor 931 is increased relative to the rotation number of the restricting gear 920.

The electric motor 931 is coupled with the information-processing unit 400 and the output shaft 931B is rotated by the electric power supplied by the information-processing unit 400. The rotary drive of the output shaft 931B of the electric motor 931 is transmitted to the restricting gear 920 through the drive transmitter 932 to be transmitted to the first gear 623 to which the restricting gear 920 is engaged, thereby applying a drive force for rotating the rotating body 600 by the restricting unit 900. Specifically (though details will be described below), when the rotating body 600 is rotated by the input operation of a user, the output shaft 931B of the electric motor 931 or the endless belt is idly rotated to apply a load during the input operation in accordance with the rotating condition detected by the rotary movement detector 810.

(Internal Arrangement of Information-Processing Unit)

Figure 19:
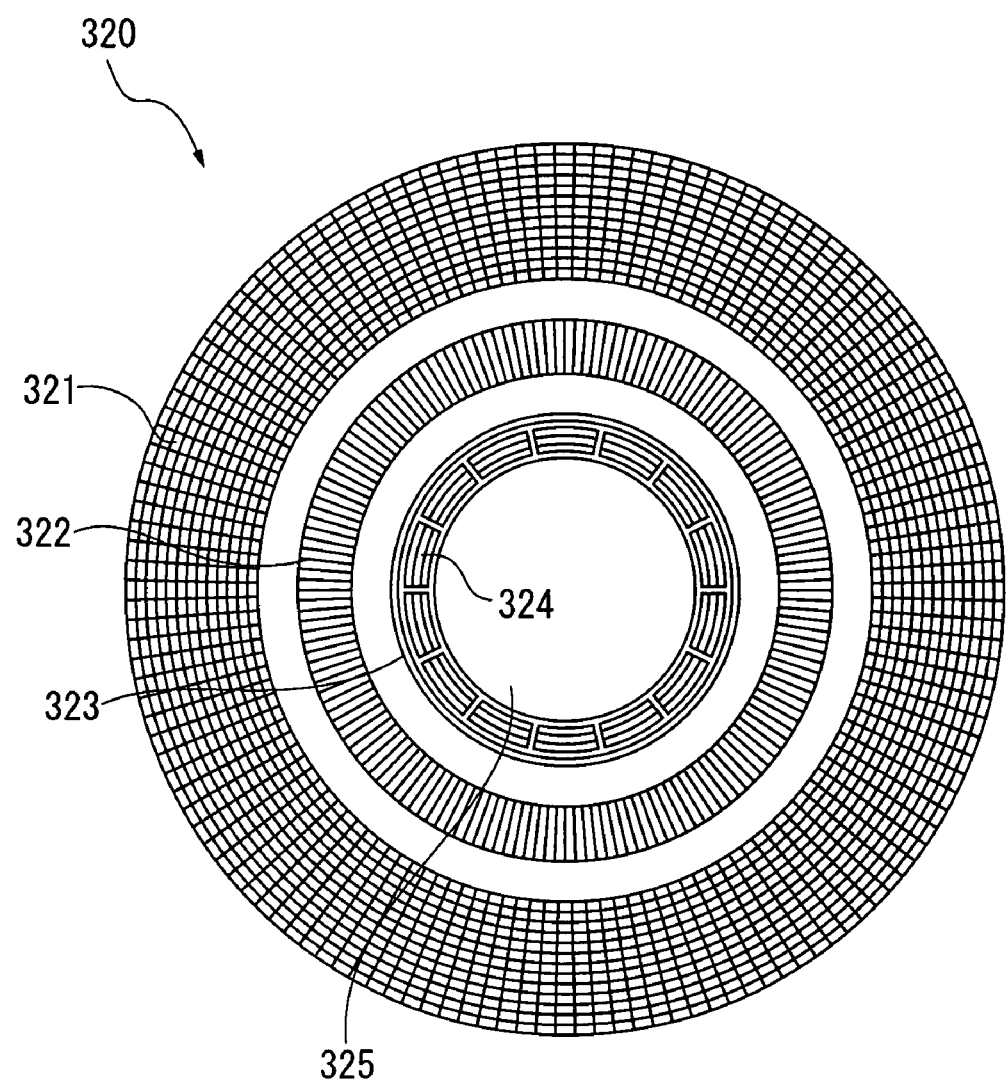
FIG. 19 is an illustration showing an outline of display area of a second display unit in the first embodiment.

Next, an internal arrangement of the above-described information-processing unit will be described below with reference to the drawings. FIG. 19 is an illustration showing an outline of display area of a second display unit. As described above, the information-processing device 300 includes the first display unit 310, the drive 330, the switch section (operation unit) 340, the communication unit 350, the storing unit 360, and the information-processing unit 400.

The first display unit 310 is coupled with the information-processing unit 400 to display information properties, processing condition and the like in accordance with the control signal output by the information-processing unit 400. Specifically, when a plurality of music data stored on CD-DA (music CD) is processed as information, the number of songs in the music data stored in CD-DA, the track number (order of music data to be processed), reproduction time including total reproduction time of all of the stored music data, reproduction time for each music data and reproduction time of the music data now being played, tempo of reproducing music data, sound volume at and around the reproducing position of the music data, low-pitched sound volume lower than a predetermined frequency, speed ratio of now-played music data relative to ordinary playing speed and the like are displayed thereon. The display unit 310 is, for instance, liquid crystal display panel, organic EL (Electro-Luminescence) panel, PDP (Plasma Display Panel), CRT (Cathode-Ray Tube), FED (Field Emission Display), electrophoresis display panel and the like.

The drive 330 is connected with the information-processing unit 400, which conducts reading processing for reading the information stored on a recording medium detachably mounted and storing processing for storing the information on the recording medium in accordance with a control signal output by the information-processing unit 400. The drive 330 is adapted for above-described various recording media. When the recording medium is an optical disc, the drive 330 includes an optical pickup and when the recording medium is memory card and the like, the drive 330 includes a connector and a processing driver, for instance. Incidentally, it is possible to employ a plurality of the drives for the various recording media instead of providing a single drive.

The switch section 340 is coupled with the information-processing unit 400, which outputs a predetermined operation signal in accordance with the input operation by a user to the information-processing unit 400 to set the information-processing condition in the information-processing unit 400. As described above, the switch section 340 includes an eject button 341 (operation member), a mode adjuster 342, a tempo adjuster 343, a cue/loop button 344, a quick return button 345, a search-setting section 346, a cue button 347, a play/stop button 348, a loop operating section 349 and the like.

The eject button 341 outputs a predetermined operation signal to the information-processing unit 400 by a pressing input operation. In accordance with output of the operation signal, the information-processing unit 400 controls a transfer mechanism (not shown) provided on the drive 330 to unload the recording medium mounted at a clamp position of the drive 330 to the outside of the body case 301 through the insertion slot 302.

The mode adjuster 342 includes a jog-mode button 342A for switching the operation mode of the information-processing device 300, and a speed adjuster 342B for setting acceleration and deceleration of reproducing speed at play-start and play-stop when the jog-mode button 342A is ON. Though described below in detail, the jog-mode button 342A switches the reproducing condition by the press detector 820 of the switch device 500. Specifically, when the jog-mode button 342A is pressed down (ON condition), an operation signal for enabling the input operation by the press detector 820, i.e. information-processing in accordance with the input operation, is output. When the jog-mode button is in OFF condition, an operation signal for disabling the input operation of the press detector 820, i.e. prohibiting the information-processing in accordance with the input operation, is output. The speed adjuster 342B is rotatably provided, which variably sets reproduction-starting speed and deceleration speed during reproduction-stopping process by the rotating operation by a user.

The tempo adjuster 343 variably sets the reproduction tempo of music data to be played by an input operation. The tempo adjuster 343 includes a tempo-adjusting knob 343A, a master tempo button 343B and a tempo range switching button 343C. The tempo-adjusting knob 343A is slidable in accordance with an input operation, which variably sets the reproduction tempo of music data to be played within a predetermined range. The master tempo button 343B variably sets the speed of reproduced sound without changing the pitch thereof in accordance with input operation. The tempo range switching button 343C variably sets the range of the tempo adjusting knob 343A in accordance with input operation.

The cue/loop button 344 actuates the drive 330 for information-processing together with other recording medium such as a memory card, which outputs an operation signal based on data-recording instructions at cue point or loop point for each optical disc (one recording medium) in accordance with press-down by an input operation of a user. The cue/loop button 344 includes a memory button 334A and a call button 334B. The memory button 334A outputs an operation signal for recording information relating to a cue point or a loop point for each optical disc in a memory card and the like in accordance with input operation. The call button 334B outputs an operation signal based on instructions for selectably reading the cue point or the loop point for each optical disc stored in the memory card and the like in accordance with input operation.

The quick return button 345 selects processing contents relating to change in reproducing condition by the switch device 500. For instance, the quick return button 345 selects at least one of processing-start or processing-stop of the information to be reproduced and change in the reproducing position of the information to be reproduced. Specifically, when the jog-mode button 342A is ON and the quick return button 345 is OFF, the processing contents relating to processing-stop or processing-start is set. When the press detector 820 of the switch device 500 detects press or contact in accordance with press or contact input operation on the rotating section 600 by a user, the processing of the information is stopped or started. On the other hand, when the quick return button 345 is ON, processing for changing the reproducing position of the reproduced information to the cue point is set. When the press detector 820 of the switch device 500 detects press or contact in accordance with press or contact input operation on the rotating section 600 by a user, the reproducing position of the reproduced information is moved the cue point.

When both of the jog-mode button 342A and the quick return button 345 are ON, both of the processing for changing the reproducing position of the reproduced information to the cue point and for moving the processing position of the reproduced information forward and backward are set. The processing for moving the reproducing position of the reproduced information to the cue point is set and the processing for moving the processing position of the reproduced position forward and backward is variably set in accordance with the rotating condition of the rotating body 600 detected by the rotary movement detector 820 of the switch device 500, of which details will be described below.

More specifically, when the press detector 820 of the switch device 500 detects press or contact in accordance with press or contact input operation on the rotating section 600 by a user, the reproducing position of the reproduced information is moved to the cue point. Further, while keeping the press or contact operation, forward or backward movement (so-called scratch) of the reproducing position of the reproduced information is conducted in accordance with the rotation of the rotating body 600 detected by the rotary movement detector 810. Incidentally, when either the jog-mode button 342A or the quick return button 345 is OFF, both of the processing for changing the reproducing position of the reproduced information to the cue point and for moving the processing position of the reproduced information forward and backward are not set.

The search setting section 346 sets a processing for forward-feeding or backward-feeding the to-be-reproduced position of the information stored in a recording medium by an input operation. The search setting section 346 includes a track search button 346A and a search button 346B. When a plurality of music data is stored, the track search button 346A sets the music data that is currently reproduced or is currently reproduction-suspended in a reproduction or reproduction-suspension condition from the start point of the preceding or proceeding music data. While the search button 346B is continuously pressed, the currently-reproduced or reproduction-suspended position is altered forward or backward.

The cue button 347 is for mainly registering a predetermined cue point. For instance, when being pressed down by a user while temporarily suspending the reproduction of optical disc, an operation signal based on instructions for a predetermined cue point, i.e. for registering the temporarily suspending position as the cue point, is output. The play/stop button

348 outputs an operation signal for starting information reproduction processing or stopping the information reproduction in accordance with input operation.

The loop operating section 349 is for setting a processing for repeatedly reproducing the information in accordance with input operation. The loop operating section 349 includes a loop-in/realtime cue button 349A, a loop-out/out-adjust button 349B, a re-loop/exit button 349C and a time-mode/auto-cue switching button 349D. When being pressed down while reproducing the information, the loop-in/realtime cue button 349A outputs an operation signal based on instructions on start point within repeated reproduction period, i.e. sets the time point of the press-down operation as the start point.

When being pressed down while reproducing the information, the loop-out/out-adjust button 349B outputs an operation signal based on instructions on end point within the repeated reproduction period, i.e. sets the time point of the press-down operation as the end point. When being pressed down, the re-loop exit button 349C outputs an operation signal based on instructions on repeated information-reproduction within the time period instructed by the loop-in/realtime cue button 349A and the loop-out/out-adjust button 349B, i.e. sets to conduct the repeated reproduction or release the repeated reproduction in accordance with the press-down operation. When the time-mode/auto-cue switching button 349D is ON, it is automatically set that silent section at the position where the information-reproduction is started is excised.

As described above, the switch device 500 includes the second display 320, the moving-condition detector 800 including the rotary movement detector 810 and the press detector 820 and the rotary drive unit 930. The second display unit 320 is coupled with the information-processing unit 400 to display information processing condition in accordance with the control signal output by the information-processing unit 400. Various display devices are used for the second display unit 320 in the same manner as the first display unit 310. As shown in FIG. 19, the second display unit 320 includes a reproducing-position display 321, a cue-point position indicator 322, a sound-memory condition display 323, a jog-touch detection display 324 and a mode display 325.

The reproducing-position display 321 is positioned on the outer circumference of the display area of the second display unit 320, which is arranged in a matrix along a substantially annular virtual locus and shaped in a narrow sector. The reproducing-position display 321 virtually displays reproducing position of recording medium by lighting light-emitting device thereof in a manner similar to rotation speed of an analog record. For instance, the reproducing position repeats rotation along substantially circular virtual locus at the same speed as an analog record that is rotated by 33 rpm. The cue-point position indicator 322 is positioned inside the display position display 321 within the display area of the second display unit 320, which has a narrow substantially linear sector-shaped light-emitting elements disposed along a substantially circular virtual locus in a manner similar to the reproducing-position display 321. The cue-point position display 322 displays a cue point position in the circumferential direction corresponding to the virtual reproducing position corresponding to an analog record displayed on the reproducing-position display 321 when the cue button 347 of the switch section 340 is pressed down by a user.

The sound-memory condition display 323 is located inside the cue-point position indicator within the display area of the second display unit 320, which is constituted by a substantially ring-shaped light-emitting elements. The sound-memory condition display 323 notifies that the information amount of a reproducing object stored in the below-described storing unit 360 falls below a predetermined amount caused by defects on read information on account of, for instance, damage and dust on a recording surface of an optical disc and partial damage on the stored information. The jog-touch detection display 324 is located inside the sound-memory condition display 323 within the display area of the second display unit 320, which has a substantially circular arrangement of relatively wide sector-shaped light-emitting elements. The jog-touch detection display 324 exhibits a predetermined display when a user presses or touches the rotating body 600 of the switch device 500. The mode display 325 is shaped in an approximate disc at the center of the display area of the second display unit 320, which displays and notifies to the effect when the operation mode set by the mode adjuster 342 is the jog mode.

As described above, the rotary movement detector 810 of the moving-condition detector 800 is coupled with the information-processing unit 400 and detects the rotating condition of the rotating body 600 to output a signal corresponding to the rotating condition to the information-processing unit 400. Specifically, when a user rotates the rotating body 600, the rotation-detecting plate 813 is rotated together with the detecting gear 812 engaged with the first gear 623 of the jog table 610, where the rotating condition (rotary speed and rotary direction) of the rotation-detecting plate 813 is detected by the rotation-detecting sensor 814 to output a detection signal relating to the rotating condition to the information-processing unit 400.

As described above, the press detector 820 of the moving-condition detector 800 is coupled with the information-processing unit 400 and detects the pressing and contacting condition of the rotating body 600 by a user to output a signal corresponding to the pressing and contact condition to the information-processing unit 400. Specifically, the pressing and touching operation of the rotating body 600 by a user presses down the rotating section 750 against the restoring force of the coil spring 713H and the cushion member 752 and the pressing bulge 751 of the rotating section 750 closes the switch 812A of the tape switch 821 to output a predetermined detection signal corresponding to the pressing operation to the information-processing unit 400. Incidentally, when a piezoelectric element is also provided and pressing condition (pressing force) can be detected, a detection signal indicating the pressing force is output.

As described above, the rotary drive unit 930 is coupled with the information-processing unit 400 and drives the electric motor 931 under control by the information-processing unit 400 in a manner that a load is applied when a user conducts input operation on the rotating body 600. Specifically, the output shaft 931B of the electric motor 931 is rotated by electric power supplied from the information-processing unit 400, the rotation of the output shaft 931B of the electric motor 931 being transmitted to the restricting gear 920 through the drive transmitter 932, thereby applying drive force for rotating the rotating body 600 through the first gear 623 to which the restricting gear 920 is engaged. Accordingly, the resistance in rotating the rotating body 600 on which rotary operation is conducted increases and decreases in accordance with the drive condition of the electric motor 931 of which drive is controlled by the information-processing unit 400, based on which different resistance is felt on a user during rotary operation of the rotating body 600 in response to rotary operation.

The communicator 350 is connected with the information-processing unit 400 and is further coupled with a server device storing information in a manner distributable through a network and terminal units such as a personal computer under control by the information-processing unit 400 to acquire the stored information and output the information to the information-processing unit 400. The network includes the Internet based on general-purpose protocol such as TCP (Transmission Control Protocol)/IP (Internet Protocol), intranet, LAN (Local Area Network), network such as communication network and broadcast network including a plurality of base stations capable of transmitting/receiving information through wireless medium, wireless medium itself as a base for directly transmitting/receiving information and the like. The wireless medium is any media including electric wave, light, sound wave, electromagnetic wave and the like. The information acquired by the communicator 350 and output to the information-processing unit 400 is stored in the storing unit 360 in a readable manner.

The storing unit 360 is a drive unit and a driver in which information is readably recorded in various recording media including magnetic disc such as HD (Hard Disc), optical disc such as DVD (Digital Versatile Disc), memory card and the like, a semiconductor memory and the like. The storing unit 360 also stores various programs executed on an OS (Operating System) for controlling the entire information-processing unit 300. Further, the storing unit 360 temporarily stores the signal to be processed by the information-processing unit 400. In other words, the storing unit 360 functions as a "memory".

The information-processing unit 400 includes a CPU (Central Processing Unit) and various I/O ports (not shown) including a display control port to which the first display unit 310 and the second display unit 320 are connected, a drive control port to which the drive 330 is connected, an input port to which the switch section 340 and the moving-condition detector 800 is coupled, a drive control port to which the rotary movement detector 930 is coupled, a communication port to which the communicator 350 is connected, a storage port to which the storing unit 360 is connected and the like. The information-processing unit 400 includes a condition recognizing unit 410, an information-acquiring unit 420, an operation controller 430, a restriction controller 440, a processing unit 450, a display controller 460 and the like, all of which are installed as various programs.

The operation signal recognizer 410 recognizes various operation signal output by the switch section 340 and detection signal output by the rotary movement detector 810 and the press detector 820 of the moving-condition detector 800, recognizes change instructions of the processing condition input by a user to set processing condition of the information. The signal related to the setting of the processing condition is output to the information acquiring unit 420, the restriction controller 440, the processing unit 450 and the display controller 460. Incidentally, when the detection signal related to pressing force from the press detector 820 is recognized, the processing condition is set in a manner corresponding to the magnitude of the pressing force, where, for instance, the reproducing speed is lowered in accordance with the magnitude of the pressing force. When the pressing force is gradually reduced from the temporal suspension of the reproduction by pressing the rotating body 600, the processing condition is set so that the time required for returning to ordinary reproducing speed is shortened in correspondence to the magnitude of the pressing force (faster reduction of the pressing force results in shorter time as compared to slower reduction of the pressing force).

When the information acquiring unit 420 recognizes a signal relating to the setting of a predetermined processing condition output by the operation signal recognizer 410, i.e. an instruction signal instructing to read predetermined information (object to be processed), the information acquiring unit 420 controllably drives the drive 330 and the storing unit 360 to read and acquire desired information stored in the recording medium. The information acquiring unit 420 acquires the record condition of the information stored in the recording medium such as reproduction time, the number of the stored information and the like.

The stored information is acquired when, for instance, it is recognized that the recording medium is mounted on the drive 330 based on the signal output from the drive 330 or it is recognized that the to-be-processed object is stored in the storing unit 360 by input operation of the switch section 340, where the drive 330 or the storing unit 360 is controllably driven to read the stored play list and TOC (Table Of Contents) information. The information acquiring unit 420 controllably drive the communicator 350 based on an input operation on the switch section 340 and demand signal output by a terminal coupled to the information-processing device 300 and the like to receive the information that is requested to retrieve from the server device and terminal device.

The property recognizing unit 430 recognizes the properties of the information (object to be processed) acquired by the information acquiring unit 420 such as sound volume, pitch, tempo and the like in music data and brightness, contrast, color and the like in image data. The properties of the information is recognized based on the information related to the information that is associated to the information and stored in a recording medium, and, alternatively, is recognized based on frequencies and the like during processing for reproducing the information by the processing unit 440 to acquire as the information related to properties. The information related to the property of the recognized information is output to the display controller 460.

The restriction controller 440 controllably drive the rotary drive unit 930 based on the signal relating to the setting of the processing condition output by the operation signal recognizer 410. Specifically, when the operation signal recognizer 410 recognizes the rotary direction and the rotary speed of the rotating body 600 based on a detection signal output by the rotation-detecting sensor 814 of the rotary movement detector 810, the restriction controller 440 rotates the electric motor 931 of the rotary drive unit 930 in a manner that the resistance against rotation in a direction for the rotating body 600 is rotated is increased or decreased in accordance with the rotation speed.

Specifically, when the rotating body 600 is slowly rotated, electric power is supplied to the electric motor 931 so that the restricting gear 920 engaged with the first gear 623 of the rotating body 600 is rotated at substantially the same rotary speed as the rotary speed of the first gear 623 in a corresponding rotary direction so as to apply little resistance feeling on a user during rotating operation. When the rotating body 600 is rotated fast, electric power is supplied to the electric motor 931 so that the restricting gear 920 is rotated at a rotary speed slower than the rotary speed of the first gear 623 or electric power is stopped so that the restricting gear 920 is not rotated. Alternatively, a predetermined electric power is supplied to the electric motor 931 so that rotation reverse to the rotary direction of the first gear 623 is generated to provide stronger resistance feeling.

The restriction controller 440 increases the electric power supplied to the electric motor 931 when the rotary direction based on the detection signal output by the rotation-detecting sensor 814 of the rotary movement detector 810 is in reverse direction (i.e. rotation reverse to a forward rotation rotating in rotary direction). In other words, when the rotary direction of the rotating body 600 is in a reverse direction, the restriction controller 440 applies on the rotating body 600 a greater drive force than that applied when the rotary direction is in forward direction. Accordingly, the rotary speeds of the first gear 623 of the rotating body 600 and the restricting gear 920 are differentiated, where the rotating output shaft of the electric motor 9931 is idly rotated by the difference of the rotary speeds without responding to the supplied electric power or the endless belt 932C may be idly rotated by the difference in the rotary speeds, so that the resistance is increased or decreased in accordance with the rotary speed of the rotation of the rotating body 600 by a rotary operation. The restricting unit according to the present invention is constituted by the restriction controller 440, the above-described attachment base 910, the restricting gear 920 and the rotary drive unit 930. The electric motor 931 may be driven in various ways including electric current control and voltage control.

The processing unit 450 includes DSP (Digital Signal Processor) and the like, which processes the information to be processed obtained by the information acquiring unit 420 so that the information to be processed is output by the output unit 200 in accordance with the signal indicating the setting of the processing condition output by the operation signal recognizer 410. The processed information is output to the output unit 200 and is reproduced in accordance with the setting contents. Specifically, in addition to normal reproduction, the reproducing position, reproducing speed, tempo, pitch and the like of the information is set or changed in accordance with the setting contents in accordance with the rotation, pressing, contact operation on the rotating body 600 and input operation on the switch section 340.

The display controller 460 controls the first display unit 310 and the second display unit 320 to display the setting contents and information-processing condition in accordance with the signal relating to the setting contents of the processing condition output by the operation signal recognizer 410 and information relating to the property of the information recognized by the property recognizing unit 430.

[Operation of Reproduction System]

Next, operation for processing the information by the above-described reproduction system 100 will be described below with reference to drawings. Incidentally, the explanation for the operation processing will be described with reference to an arrangement employing an optical disc as a recording medium in which music data is stored, however, the recording medium to be processed is not limited thereto. FIG. 20 is a flow chart showing how the reproduction processing is conducted in information-processing operation of the reproduction. FIG. 21 is a flow chart showing how the reproduction processing is changed in information-processing operation of the reproduction system.

Initially, after electric power is supplied to the reproduction system 100 in advance and a recording medium such as an optical disc is inserted into the insertion slot 120 (Step S101), the information-processing unit 400 controllably drives the drive 330. The recording medium is mounted at a predetermined position in the drive 330 within the body case 110 using an auto-loading mechanism and the like. When recognizing that the recording medium is mounted in the drive 330, the information-processing unit 400 controllably drives the drive 330 by the information acquiring unit 420 to read the record information stored in the recording medium. Further, the first display unit 310 is controlled by the display controller 460 to display the record information (Step S102). Subsequently, the information-processing unit 400 recognizes with the operation signal recognizer 410 the operation signal output in accordance with input operation on the switch section 340 by a user (Step S103), and sets the input processing condition (Step S104). Incidentally, Steps S103 and S104 are conducted in subsequent processing and the processing condition is set based on the operation signal until the reproduction processing is completed.

Subsequently, selection for music data to be processed is in wait (Step S105). Specifically, whether any music data is selected or not is judged. When selection of the music data to be processed is recognized, the drive 330 and the storing unit 360 are controlled by the information acquiring unit 420 to read the selected music data (Step S106). The display controller 460 displays the information relating to music data such as reproduction time and track number of the selected music data, the registered number in the play list and the like. Subsequently, reproduction for the music data to be processed is in wait (Step S107).

Specifically, whether the play/stop button 348 is input-operated or not is judged and, when reproduction command by the input operation on the play-stop button 349 is recognized, reproduction processing for processing the music data in a manner capable of outputting by the output unit 200 is conducted by the processing unit 450 and the processed music data is sequentially output to the output unit to be output by the sound-producing section 210 as sound (Step S108). During the reproduction processing in Step S108, the property of the music data, i.e. tempo (rhythm), sound volume of low-pitched sound and the like are recognized by the property recognizing unit 430 of the information-processing unit 400 (Step S109). Further, reproduction processing condition such as reproducing speed and the property recognized in Step S109 is displayed on the first display unit 310 and the second display unit 320 (Step S110).

In displaying the reproduction-processing condition on the second display unit 320, the reproducing position is recognized. Initially, the total frame number reproduced from reproduction start point to the current elapsed track time is calculated based on the record information of music data. Specifically, time information (minute Min, second Sec and frame number Fn) contained in the stored information is detected and the total frame number N is calculated in accordance with the following Formula 1.

$$N=(Min*60*75)+(Sec*75)+Fn \quad \text{(Formula I)}$$

The calculated total frame number N is divided by a predetermined coefficient K and remainder A as reproducing position information is calculated. The coefficient K is a preset value determined for each of the discs (optical disc) as recording medium. For instance, it is set that K=135 considering CD's frame number 75 per one second and record player's rotation speed 33 RPM (0.55 rotation per second). Then, the reproducing position is displayed by lighting the light-emitting element located at the position in a clockwise direction corresponding to the calculated reproducing position information with reference to the twelve o'clock position of the reproducing-position display 321 of the second display unit 320 to indicate the reproducing position. Incidentally, since the calculated reproducing-position information shifts in accordance with increase in the frame number, the displayed reproducing position moves in a manner rotating along the substantially circular virtual locus.

Further, when a user presses down the cue button 347 of the switch section 340, the operation signal is recognized by the operation signal recognizer 410 to output a signal for setting the information-processing condition. When recognizing the signal, the display controller 460 sets the reproducing position information at the time the signal is received as the cue-point information and lights the light-emitting elements positioned in clockwise direction corresponding to the cue-point information with reference to the twelve o'clock position on the cue-point position display 322 to display the cue-point. The calculated cue-point information is stored in the storing unit 360.

While the processing unit 450 reproduces the music data, whether the rotating body 600 is pressed or not is judged (Step S111). Specifically, the operation signal recognizer 410 judges whether the operation signal is output by the press detector 820 or not. When the pressing operation is not recognized in Step S111, the reproduction processing is continued back to Step S108. On the other hand, when the pressing operation is recognized in Step S111, the operation signal recognizer 410 judges whether the quick return button 345 is ON or not (Step S112). Specifically, the operation signal recognizer 410 judges which one of change-instructions, i.e. change instructions for play/stop of the processing and change in reproducing position, is indicated by the change in reproducing condition indicated by the detection signal of the pressing operation on the rotating body 600.

In Step S112, judging that the quick return button 345 is pressed to be ON and the change instructions for the reproducing condition indicate the change in the reproducing position, the processing unit 450 sets the reproducing speed at 0% and moves the reproducing position at the cue-point. On the other hand, in Step S112, when it is judged that the quick return button 345 is not ON (i.e. is OFF) and the change instructions indicate the change in play/stop of the processing in Step S112, the processing unit 450 stops the reproduction processing by gradually decreasing the reproducing speed to 0% in accordance with the deceleration speed during the reproduction stopping process set by the speed adjuster 342B of the switch section 340 and recognized by the operation signal recognizer 410 (Step S114).

After Steps S113 and 114, the operation signal recognizer 410 judges whether the rotating body 600 is rotated or not based on the detection signal from the rotary movement detector 810 of the rotating body 600 (Step S115). When it is judged that the rotating body 600 is not rotated in Step S115, the operation signal recognizer 410 judges whether the pressing on the rotating body 600 continues or not (Step S116). On the other hand, when it is judged that the rotating body 600 is rotated in Step S115, the operation signal recognizer 410 judges whether the rotary direction is in positive (forward) rotation (FWD) or not based on detection signal (Step S117).

When forward rotation is judged in Step S117, the rotary speed indicated by the detection signal from the rotary movement detector 810 is recognized (Step S118). Further, the restriction controller 440 rotates the electric motor 931 in a predetermined direction at predetermined rotary speed based on the rotary direction and rotary speed recognized in Steps S117 and 118 to conduct restriction processing for reducing the rotary speed of the restricting gear 920 as the rotary speed of the rotating body 600 becomes higher to apply greater load on the rotary operation caused by greater speed difference (Step S119). Subsequently, the processing unit 450 conducts reproduction processing so that the reproducing speed is increased in the forward direction in accordance with the rotary speed (Step S120).

On the other hand, when no-forward rotation, i.e. reverse rotation (REV), is judged in Step S117, the rotary speed indicated by the detection signal from the rotary movement detector 810 is recognized (Step S121). Further, the restriction controller 440 rotates the electric motor 931 in a predetermined direction at predetermined rotary speed based on the rotary direction and rotary speed recognized in Steps S117 and 121 to conduct restriction processing for reducing the rotary speed of the restricting gear 920 as the rotary speed of the rotating body 600 becomes higher to apply greater load on the rotary operation caused by greater speed difference (Step S122). During the restriction processing, a restriction stronger than in the restriction processing in Step S119 is applied. In other words, the restriction processing is conducted so that greater drive force than that applied when the rotary direction is forward direction is applied on the rotating body 600. Subsequently, the processing unit 450 conducts reproduction processing so that the reproducing speed is increased in the reverse direction in accordance with the rotary speed (Step S123).

After Steps S119 or Step S122, the process moves on to Step S116. When it is judged that the pressing on the rotating body 600 is continued in Step S116, so-called scratch processing is continued back to Step S115. On the other hand, when it is determined that the pressing condition is no longer conducted in Step S116, the processing unit 450 conducts processing for setting the reproducing speed as 100% in accordance with the reproduction-starting speed of the speed adjuster 342B set by the operation signal recognizer 410 (Step S124).

Subsequently, the information processing unit 400 judges whether stop instruction for reproduction processing, i.e. reproduction stop in accordance with the input operation on the play/stop button 348 is recognized or not by the operation signal recognizer 410 (Step S125). When the reproduction stop is not recognized in Step S125, the reproduction processing is continued back to Step S108. On the other hand, when it is judged that the reproduction stop is recognized in Step S125, the reproduction is stopped to terminate the reproduction processing.

[Effect of Reproduction System]

In the information-processing device 300 of the reproduction system 100 according to the above-described embodiment, when the rotating body 600 of the switch device 500 is rotated by the input operation of a user, the restricting unit 900 restricts the rotation of the rotating body 600 based on the detection signal output by the rotary movement detector 810 in response to the input operation on the rotating body 600. According to the above arrangement, a user senses different resistance feeling in, for instance, slow rotary operation and fast operation on the rotating body 600 and operational feeling just like rotating a turntable of a record player can be obtained. Accordingly, a playing style capable of reproducing the music data on various recording media in the same operational feeling as a conventional record player can be achieved.

A turntable of a record player for reproducing a phonorecord is simulated, which is applied for an arrangement for restricting the rotary movement of the rotating body 600 in which the reproducing condition is changed in accordance with the rotating condition of the rotary operation. The switch device 500 is used for DJ playing for a disc jockey in which the reproducing condition is changed in accordance with the input operation in music and video reproduction. Since input operation feeling is of an important issue for such a switch device, more appropriate and improved playing style can be achieved. Further, the information-processing unit 400 for conducting information-processing and the switch device 500 for setting the processing condition of the information-processing are integrally provided. Accordingly, no connection is required for information-processing and information-processing can be immediately performed. Further, the rotating body 600 can be designed in a shape simulating a turntable of a record player and the designability can be improved.

Further, the information-processing unit 400 of the information-processing device 300 achieves various functions as program. Accordingly, by incorporating the program on personal computer, CPU and the like, or by using a recording medium storing the program, the above arrangement for processing can be easily attained, thereby easily improving productivity and enlarging usage. The information-processing unit 400 includes the restriction controller 440 for controlling the restricting unit 900 for restricting the movement in accordance with the rotary input operation. Accordingly, an arrangement for providing the sense in response to information processing and movement restriction corresponding to the input operation for setting the processing condition of the information can be achieved with a single arrangement of circuit board and CPU with the use of program, thereby easily simplifying the configuration.

In order to output the operation signal corresponding to the rotating, pressing or touching operation on the rotating body 600 of the switch device 500, the switch device 500 is provided with the rotary movement detector 810 and the press detector 820. Accordingly, in the same manner as the operation for a record player during the above-described DJ playing, the switch device 500 that is capable of changing the reproducing position and temporarily suspending the reproducing position can be easily provided. Further, in order to move a pickup to a predetermined position during DJ playing, the cue point can be set and the reproducing position can be moved to the cue point by pressing operation. Accordingly, usability can be further enhanced, and the movement toward the cue point can be more easily and speedily conducted as compared with a conventional DJ playing by digital processing of music data and video data.

The rotary movement detector 810 includes the rotation-detecting sensor 814 including the above-described optical sensor 814A to detect the rotary operation. Accordingly, the rotary operation can be easily detected with a simple structure. Especially, since the rotation of the rotation-detecting plate 813 integrally provided on the detecting gear 812 engaged with the first gear 623, light resistance that is not felt heavy during the rotary operation can be felt to provide improved operation feeling, and an input operation that rapidly changes during DJ playing such as reverse rotation can be securely detected.

Further, the press detector 820 employs the tape switch 821. Accordingly, the pressing operation can be easily detected with a simple structure. Further, the tape switch is circumferentially disposed around the periphery of the rotating body 600. Accordingly, the pressing operation can be sensed irrespective of the position at which the rotating body 600 is pressed, and a little pressing sense in addition to mere touch can be obtained, thereby providing enhanced operational feeling. When both of the pressing operation and rotary operation are sensed to set the information processing in diverse conditions, an information-processing corresponding only to rotary operation can be performed and various processing can be set by different input operations and the combination thereof, thereby improving versatility.

In order to provide the touch in response to the input operation, the load applied on the movement of the rotating body 600 (i.e. the load during the rotary operation), to which the input operation is conducted, is controlled to be changed. Accordingly, the sense corresponding to the property such as increase and decrease in the resistance during rotation can be easily obtained with a simple arrangement.

When the load changes, the restriction processing for restricting the rotary movement of the rotating body 600 and assisting processing for assisting the rotary movement are selectively conducted to change the load. Accordingly, as the touch corresponding to the input operation, different sense can be provided in accordance with different processing such as the movement restriction and movement assistance, thereby easily improving versatility and usability.

The resistance for the rotary movement is increased as the restriction processing. Accordingly, the touch corresponding to property can be effectively provided, and an arrangement for efficiently providing the touch can be easily constructed The assistance for the rotary movement is decreased to apply increasing load during the assisting processing. Accordingly, the touch is transmitted while assisting the input operation, thereby providing facilitated input operation.

When the rotating body 600 is rotated, the rotary drive unit 930 of the restricting unit 900 rotates the output shaft 931B of the electric motor 931 in accordance with the rotation to apply a drive force for rotating the rotating body 600. The resistance in rotating the rotating body 600 operated by the drive force increases and decreases in accordance with the drive condition of the electric motor 931. Accordingly, a user can sense resistance feeling different in accordance with the rotating condition of the rotating body 600 and an operation feeling for rotating a turntable of a conventional record player can be obtained with a simple arrangement. Accordingly, a DJ playing style capable of reproducing the music data in the same operational feeling as a conventional record player can be achieved.

Then, the rotary drive unit 930 of the restricting unit 900 conducts the restriction processing based on the rotary direction and speed recognized on the basis of the detection signal from the rotary movement detector 810 so that the rotary speed of the restricting gear 920 is lowered in accordance with the increase in the rotary speed of the rotating body 600 to enlarge the speed difference therebetween to apply greater load on the rotary operation. Accordingly, greater drive force is applied on the rotating body 600 by the electric motor 931 in accordance with the speed of the rotation of the rotating body 600. Accordingly, a user can sense resistance feeling in accordance with the rotary speed of the rotating body 600. Consequently, approximately the same operational feeling as the rotation of a turntable of a conventional record player while changing the rotary speed thereof can be obtained with a simple arrangement.

When the rotary direction recognized based on the detection signal from the rotary movement detector 810 is reverse direction, the rotary drive unit 930 of the restricting unit 900 applies a drive force greater than that applied when the rotary direction is forward direction. Accordingly, a user senses a greater resistance force when the rotating body 600 is rotated in reverse direction. Consequently, approximately the same operation feeling as the reverse rotation of a turntable of a conventional record player that is rotated in forward direction can be obtained.

Further, the rotary movement detector 810 of the movement condition detector 800 includes the detection gear 812 engaged with the first gear 623 to be rotated in accordance with the rotation of the jog table 610, a rotation-detecting plate 813 integrally attached on the detection gear 812 in an approximately coaxial manner, and a rotation detecting sensor 814 that detects rotary speed and rotary direction of the rotation-detecting plate 813 outputs a detection signal as the movement condition of the rotating body 600. Accordingly, the detection gear 812 and the rotation-detecting plate 813 are rotated in accordance with the rotation of the jog table 610, and the rotating condition of the rotation detecting plate is detected by the rotation detecting sensor 814, thereby easily detecting the rotary direction and rotary speed of the rotating body 600 with a simple arrangement. Further, since the rotation of the jog table 610 is directly transmitted to the detection gear 812 and the rotation-detecting plate 813, the rotation of the rotating body 600 can be accurately detected.

The restricting unit 900 includes the restricting gear 920 engaged with the first gear 623 and the electric motor 931 that applies rotary drive force on the restricting gear 920 via the intermediate rotating body 932B and the endless belt 932C, where the electric motor 931 is driven with a predetermined drive force in accordance with the relative speed difference between the rotary speed detected by the rotary movement detector 810 and the rotary speed of the rotating body 600 to apply resistance force on the rotating body 600. Accordingly, the restricting unit 900 can rotate the restricting gear 920 in accordance with the rotation of the first gear 623 of the jog table 610, and the resistance force by the drive of the electric motor 931 can be accurately transmitted through the restricting gear 920.

Further, the information property that provides the touch, condition of the rotary input operation and the information-processing condition are displayed. Specifically, the properties such as peak condition of low-pitched sound volume, tempo and the like are displayed on the first display unit 310; the rotary condition of the input operation such as the setting position, the reproducing position and the like are displayed on the second display unit 320; and processing condition such as the reproduction time, speed and the like are displayed on the first display unit 310. Accordingly, visual check can be supplied to a user in addition to the touch sense, so that the processing condition for reproducing the information can be easily set, where the rotating, pressing and touching operation of the rotating body 600 and the input operation on the switch section 340 can be easily conducted.

The reproduction system 100 is arranged by connecting the output unit 200 with the information-processing device 300 to output the processed information. Accordingly, various devices can be selectively used as the output unit 200, so that the reproduction can be performed in accordance with the environment in which the information is output including outdoors, indoors, large and small space, thereby improving versatility.

Modifications of Embodiments

Though preferred embodiments of the present invention have been exemplified so far, the scope of the present invention is not limited to the above embodiments, but includes various improvements and alteration of design as long as an object of the present invention can be achieved.

Though the switch device 500 simulates the shape of a turntable of a record player for reproducing a phonorecord, any configuration may be used. For instance, the jog table 610 may not be disc-shaped, but may be configured in a rectangular column or star-shaped, or may be shaped in the motif of various characters.

Though the reproduction system 100 suitable for DJ playing is for processing music information, the information to be processed includes not only music information but also other information such as image information and character information. Further, the device is not limited to those used for DJ player, the reproduction device may be used for reproducing any other information.

Though the reproduction system 100 has the information-processing device 300 connected with the output unit 200, the information-processing device 300 and the output unit 200 may be integrally provided.

Though the load is changed in accordance with the rotary operation on the rotating body 600, the movement may be restricted so that the load is changed (i.e. increased or decreased) in accordance with the pressing operation and the like on the rotating body 600. The change in the load may not accompany both of increase and decrease, but may be only one of increase and decrease. Further, the movement restriction may be conducted according to the movement condition of the input operation on the switch section 340 other than the rotating body 600. The present invention may be applied to switch devices of any devices other than the above-described information-processing device 300.

Further, information-processing unit and the processing controller may be constructed by installing a predetermined program on a computer, and the switch device 500 may be connected to the computer for information-processing by the computer, or the switch device 500 may be installed on a game machine or a controller connected to a game machine. In other words, the present invention may be applied not only to an arrangement for processing music data and video data, but may be applied to an arrangement for processing application software of game software.

Though the output unit 200 for reproducing (outputting) the information includes both of the sound-producing section 210 and the display unit 220, the output unit 200 may include only one of the components.

Though the drive force of the electric motor 931 is transmitted to the restricting gear 920 through the drive transmitter 932 in the restricting unit 900, the load for movement restriction may be controlled in an alternative manner. For instance, the restricting gear 920 may be directly provided on the output shaft of the electric motor 931 without using the drive transmitter 932; so-called direct drive mechanism where the drive force of the electric motor 931 is transmitted to a rotary shaft for rotatably supporting the rotating body 600 may be employed; without providing the restricting gear 920 and the first gear 623, the drive force is applied on a roller (contact member) to be in contact with the circumference of the guide rib 621 and the jog ring 650; the resistance during rotation is changed by changing the frictional force in rotating the rotating body 600 by altering the contacting degree of the contact member having friction member such as rubber using solenoid instead of the electric motor 931; non-contact mechanism may be used, where a magnet is provided on the backside (lower side) of the rotating body 600 and magnetism-generating unit is provided for partially generating magnetism or changing polarity at a position opposing to the movement locus of the magnet by rotary movement of the rotating body 600, the repulsive or attractive function between the magnet and the magnetism generating unit according to the generated or change polarity changing the resistance during the rotation of the rotating body 600. The non-contact mechanism allows smooth resistance change during rotation.

The rotary movement detector 810 may not use the optical sensor 814A as described above, but a magnetic sensor may be used. Alternatively, a power generator may be connected to a rotary shaft of a roller and a gear touching the rotating body 600 to read the current value and voltage generated by rotation.

A tape switch may not be used for the press detector 820 as in the above, but any arrangement such as pressure-sensitive sensor and piezoelectric element may be used as long as pressing and contact can be detected. Further, the press detector may not be provided on the flange 713 but may be disposed at any position (e.g. the top board 711) as long as pressing and contact can be detected.

When the rotating body 600 is rotated and reproduction processing is conducted in steps S119 and 122, the restricting unit 900 may be controlled so that the rotating body 600 is vibrated during rotary operation in accordance with, for instance, the low-pitched sound volume at the reproducing position of music data. According to the above arrangement, even when the reproduction of music data reproduced by input operation by a user cannot be heard, reproducing condition can be easily recognized and efficient input operation (playing style) can be conducted. Incidentally, the vibration may be set in accordance with various properties of the information as well as the low-pitched sound volume, the properties including, for instance, sound volume peak, rhythm, tempo, sound volume peak at a specific frequency or in a frequency band and sound volume of more than a predetermined volume: further, not only sound information, chapter-switching position (where the chapter of video data is set as the property) and video-scene switching position. Further, the vibration may not be periodic vibration but may be click-like vibration.

The rotary drive unit 930 may be arranged so that the movement amount (i.e. rotary angle) of the rotating body 600 is recognized based on the detection signal from the rotary movement detector 810 and the drive force in accordance with the movement amount of the rotating body 600 is applied on the rotating body 600. According to the above arrangement, when the movement amount is increased in accordance with the movement amount of the rotating body 600, a drive force approximately proportional to the movement amount is applied on the rotating body 600 in a direction reverse to the rotation of the rotating body 600. Accordingly, the drive force in accordance with the movement amount is applied on the rotating body 600 and a user can sense a resistance force in accordance with the drive force. An example of the above arrangement includes a biasing unit such as a spring connecting a part of the rotating body 600 and the mount 710. According to the above arrangement, resistance force reverse to the rotation of the rotating body 600 can be applied to the rotating body 600 in accordance with the movement amount of the rotating body 600, so that the arrangement of the restricting unit 900 can be simplified.

Further, the restricting unit 900 may control the drive force applied on the rotating body 600 in accordance with specific type of the information recognized by the property recognizing unit 430. For instance: when the property recognizing unit 430 recognizes music data, the restricting unit 900 applies drive force in accordance with the rotary operation on the rotating body 600 as described above; on the other hand, when the property recognizing unit 430 recognizes image data, the restricting unit 900 does not apply drive force on the rotating body 600. According to the above arrangement, when a user tries to play music data in playing style of a disc jockey for instance, the restricting unit 900 improves the rotary operability of the rotating body 600 by applying a predetermined drive force. When a user operates the rotating body 600 for editing and browsing image data and the like, since the drive force by the restricting unit 900 is not applied, the user can freely rotate the rotating body 600.

Further, the restricting unit 900 may apply drive force on the other various switch sections 340. For instance, the restricting unit 900 may apply drive force in accordance with the moving distance of the tempo adjusting knob 343A of the tempo adjuster 343. According to the above arrangement, drive force is applied in a direction for the tempo adjusting knob 343A to return to an initial position (i.e. approximate center of the variable range of the tempo adjusting knob 343A) so that the drive force is proportional to the movement distance for the initial position. Further, the drive force may be applied in accordance with the movement speed of the movement of the tempo adjusting knob 343A. According to the above arrangement, a user can feel resistance force by the drive force when the tempo adjusting knob 343A is moved, so that the movement amount and movement speed of the tempo adjusting knob 343A can be recognized by the resistance force.

The restricting unit 900 may not be the above-described rotary or slide switch, but may be a hold-down switch to which the drive force is applied. For instance, the restricting unit 900 may apply the drive force in accordance with the hold-down condition of the search button 346B. The restricting unit applies strong drive force when the search button 346B is firmly pressed and weak drive force when being softly pressed. According to the above arrangement, different processing is conducted according to the press condition of the search button 346B, where high-speed search is conducted by the information-processing unit 400 when the search button 346B is firmly pressed and low-speed search is conducted when being softly pressed. In the above, a user can recognize the press condition with reference to the resistance force when the search button 346B is held down, thereby easily conducting desired processing by the information-processing unit 400.

Further, when the information is judged to be music data by the property recognizing unit 430, the rotary drive unit 930 may constantly rotate the rotating body 600 with a predetermined drive force transmitted via the electric motor 931 while the music data is reproduced. At this time, the rotary direction and the rotary speed is set approximately the same as a conventional record player. According to the above arrangement, a user can feel the same operation feeling as an operation on a rotary turntable of conventional record player by operating the rotating body 600 rotated by a predetermined drive force.

Specific arrangement and steps for implementing the present invention may be changed in the other arrangement as long as an object of the present invention can be achieved.

Effects of Embodiments

In the information-processing device 300 of the reproduction system 100 according to the above-described embodiment, when the rotating body 600 of the switch device 500 is rotated by the input operation of a user, the restricting unit 900 restricts the rotation of the rotating body 600 based on the detection signal output by the rotary movement detector 810 in response to the input operation on the rotating body 600. According to the above arrangement, a user senses different resistance feeling in, for instance, slow rotary operation and fast operation on the rotating body 600 and operational feeling just like rotating a turntable of a record player can be obtained.

INDUSTRIAL APPLICABILITY

The present invention can be used for a switch device that has an operation unit on which an input operation is conducted, an information-processing device and reproduction device.

The invention claimed is:

1. A switch device, comprising: an operation unit that is moved by an input operation;
a movement condition detector that recognizes a moving speed of the operation unit as a movement condition of the operation unit and outputs an operation signal in accordance with the movement condition; and a restricting unit that conducts at least one of a restriction processing for restricting the movement of the operation unit and an assistance processing for assisting the movement of the operation unit based on the operation signal in accordance with the movement condition of the operation unit, wherein the movement condition detector includes a rack provided on the operation unit, a pinion engaged with the rack and rotated in accordance with the movement of the operation unit, and a rotation detector for detecting a rotary condition of the pinion, the movement condition of the operation unit being recognized based on the rotary condition of the pinion detected by the rotation detector, and wherein the restricting unit includes a restricting gear engaged with at least one of the rack and the pinion of the movement condition detector, a rotary drive unit for rotating the restricting gear, and a restriction controller that restricts the drive condition of the rotary drive unit so that relative difference between the moving speed of the operation unit and the rotary speed of the restricting gear increases and decreases in accordance with the movement condition of the operation unit by the input operation.

2. A switch device, comprising: an operation unit that is moved by an input operation;

a movement condition detector that recognizes a moving speed of the operation unit as a movement condition of the operation unit and outputs an operation signal in accordance with the movement condition; and a restricting unit that conducts at least one of a restriction processing for restricting the movement of the operation unit and an assistance processing for assisting the movement of the operation unit based on the operation signal in accordance with the movement condition of the operation unit, wherein the restricting unit includes a contact member that is in slide contact with the operation unit and a restriction controller that changes a slide contact degree of the contact member in accordance with the movement condition of the operation unit by the input operation.

3. A switch device, comprising: an operation unit that is moved by an input operation;

a movement condition detector that recognizes a moving speed of the operation unit as a movement condition of the operation unit and outputs an operation signal in accordance with the movement condition; and a restricting unit that conducts at least one of a restriction processing for restricting the movement of the operation unit and an assistance processing for assisting the movement of the operation unit based on the operation signal in accordance with the movement condition of the operation unit, wherein the restricting unit includes a contact member that is in contact with the operation unit and is rotatable in accordance with the movement of the operation unit, a rotary drive unit that rotates the contact member, and a restriction controller that controls the drive condition of the rotary drive unit so that the difference between the moving speed of the operation unit and the rotary speed of the contact member increases at a contact position of the operation unit and the contact member in accordance with the movement condition of the operation unit by the input operation.

4. A switch device, comprising: an operation unit that is moved by an input operation;

a movement condition detector that recognizes a moving speed of the operation unit as a movement condition of the operation unit and outputs an operation signal in accordance with the movement condition; and a restricting unit that conducts at least one of a restriction processing for restricting the movement of the operation unit and an assistance processing for assisting the movement of the operation unit based on the operation signal in accordance with the movement condition of the operation unit, wherein the restricting unit includes: a magnet provided on the operation unit; a magnetism generating unit opposed to the magnet and disposed in a manner corresponding to a movement locus of the magnet that is moved in accordance with the movement of the operation unit, the magnetism generating unit generating a magnetic pole of a predetermined polarity at the position to which the magnet is opposed; and a restriction controller that controls the generation of the predetermined polarity by the magnetism generating unit so that the degree of restriction of the movement of the operation unit by repulsion or attraction between the magnetic pole of the predetermined polarity generated by the magnetism generating unit and a polarity on an opposing side of the magnet fluctuates in accordance with the movement condition of the operation unit by the input operation.

\* \* \* \* \*